United States Patent
Malyala et al.

(10) Patent No.: US 8,580,216 B2
(45) Date of Patent: Nov. 12, 2013

(54) CATALYST AND METHOD FOR REDUCING NITROGEN OXIDES IN EXHAUST STREAMS WITH HYDROCARBONS OR ALCOHOLS

(75) Inventors: Rajashekharam V. Malyala, Camarillo, CA (US); Stephen J. Golden, Santa Barbara, CA (US)

(73) Assignees: ECS Holdings, Inc., Cleveland, OH (US); Catalytic Solutions, Inc., Ventura, CA (US)

( * ) Notice: Subject to any disclaimer, the term of this patent is extended or adjusted under 35 U.S.C. 154(b) by 1336 days.

(21) Appl. No.: 11/363,301

(22) Filed: Feb. 24, 2006

(65) Prior Publication Data
US 2006/0228283 A1 Oct. 12, 2006

Related U.S. Application Data

(60) Provisional application No. 60/657,500, filed on Feb. 28, 2005.

(51) Int. Cl.
*B01D 53/56* (2006.01)

(52) U.S. Cl.
USPC .......... 423/239.1; 423/213.2; 423/213.7; 502/303; 502/304; 502/305; 502/324; 502/325; 502/340; 502/345; 502/347; 502/349; 502/353; 502/344; 502/355

(58) Field of Classification Search
None
See application file for complete search history.

(56) References Cited

U.S. PATENT DOCUMENTS

| | | | |
|---|---|---|---|
| 5,017,538 A | 5/1991 | Takeshima | |
| 5,260,043 A | 11/1993 | Li et al. | |
| 5,534,237 A | 7/1996 | Yoshida et al. | |
| 5,559,072 A | 9/1996 | Itoh et al. | |
| 5,714,432 A | 2/1998 | Yoshida et al. | |
| 5,882,607 A * | 3/1999 | Miyadera et al. | 422/177 |
| 5,885,923 A * | 3/1999 | Yoshida et al. | 502/312 |
| 5,980,844 A | 11/1999 | Kharas | |

(Continued)

FOREIGN PATENT DOCUMENTS

WO 2005016496 A1 2/2005

OTHER PUBLICATIONS

Eranen, et al., "Continuous reduction of NO with octane over a silver/alumina catalyst in oxygen-rich exhaust gases: combined heterogeneous and surface-mediated homogenous reaction", Journal of Catalysis, vol. 219, 2003, pp. 25-40.

(Continued)

*Primary Examiner* — Melvin C Mayes
*Assistant Examiner* — Smita Patel
(74) *Attorney, Agent, or Firm* — Thaddius J. Carvis

(57) ABSTRACT

A catalyst system and a method for reducing nitrogen oxides in an exhaust gas by reduction with a hydrocarbon or oxygen-containing organic compound reducing agent are provided. The catalyst system contains a silver catalyst and a modifier catalyst, where the modifier catalyst contains a modifier oxide, where the modifier oxide is selected from the group consisting of iron oxide, cerium oxide, copper oxide, manganese oxide, chromium oxide, a lanthanide oxide, an actinide oxide, molybdenum oxide, tin oxide, indium oxide, rhenium oxide, tantalum oxide, osmium oxide, barium oxide, calcium oxide, strontium oxide, potassium oxide, vanadium oxide, nickel oxide, tungsten oxide, and mixtures thereof. The modifier oxide is supported on an inorganic oxide support or supports, where at least one of the inorganic oxide supports is an acidic support. The catalyst system of the silver catalyst and the modifier catalyst provides higher $NO_x$ conversion than either the silver catalyst or the modifier catalyst alone.

18 Claims, 9 Drawing Sheets

(56) References Cited

U.S. PATENT DOCUMENTS

| | | | |
|---|---|---|---|
| 6,063,351 | A | 5/2000 | Hamon et al. |
| 6,284,211 | B1 * | 9/2001 | Miyadera et al. ......... 423/239.1 |
| 2003/0143142 | A1 | 7/2003 | Schwefer et al. |
| 2005/0129601 | A1 * | 6/2005 | Li et al. ..................... 423/239.2 |
| 2007/0059223 | A1 | 3/2007 | Golunski et al. |

OTHER PUBLICATIONS

Iwamoto, et al., "Cu-ZSM-5 zeolite as highly active catalyst for removal of nitrogen monoxide from emission of diesel engines", Applied Catalysis, vol. 70, 1991, pp. L1-L5.

Held, et al., "Catalytic NOx Reduction in Net Oxidizing Exhaust Gas", SAE Technical Paper Series No. 900496, 1990, pp. 13-19.

Armor, "Catalytic reduction of nitrogen oxides with methane in the presence of excess oxygen: a review", Catalysis Today, vol. 26, 1995, pp. 147-158.

Feng, et al., "FeZSM-5: A Durable SCR Catalyst for $NO_x$ Removal from Combustion Streams", Journal of Catalysis, No. 166, 1997, pp. 368-376.

Subbiah, et al., "$NO_x$ reduction over metal-ion exchanged novel zeolite under lean conditions: activity and hydrothermal stability", Applied Catalysts B: Environmental, vol. 42, 2003, pp. 155-178.

Li, et al., On the Promotion of Ag-ZSM-5 by Cerium for the SCR of NO by Methane, Journal of Catalysis, vol. 182, 1999, pp. 313-327.

Li, et al., "Effects of water vapor and sulfur dioxide on the performance of Ce-Ag-ZSM-5 for the SCR of NO with $CH_4$", Applied Catalysis B: Environmental, vol. 22, 1999, pp. 35-47.

Walker, "Mechanistic studies of the selective reduction of $NO_x$ over Cu/ZSM-5 and related systems", Catalysis Today, vol. 26, 1995, pp. 107-128.

Armor, "Catalytic removal of nitrogen oxides: where are the opportunities?", Catalysis Today, vol. 26, 1995, pp. 99-105.

Traa, et al., "Zeolite-based materials for the selective catalytic reduction of $NO_x$ with hydrocarbons", Microporous and Mesoporous Materials, vol. 30, 1999, pp. 3-41.

Armor, "$No_x$/hydrocarbon reactions over gallium loaded zeolites: A review", Catalysis Today, vol. 31, 1996, pp. 191-198.

Yu, et al., "Mechanism of the selective catalytic reduction of $NO_x$ by $C_2H_5OH$ over $Ag/Al_2O_3$", Applied Catalysis B: Environmental, vol. 49, 2004, pp. 159-171.

Bogdanchikova, et al., "On the nature of the silver phases of $Ag/Al_2O_3$ catalysts for reactions involving nitric oxide", Applied Catalysis B: Environmental, vol. 36, 2002, pp. 287-297.

Shibata, et al., "Ag cluster as active species for SCR of NO by propane in the presence of hydrogen over Ag-MFI", Journal of Catalysis, vol. 222, 2004, pp. 368-376.

Kameoka, et al., "Selective catalytic reduction of $NO_x$ with $CH_3OH$, $C_2H_5OH$ and $C_3H_6$ in the presence of $O_2$ over $Ag/Al_2O_3$ catalyst: Role of surface nitrate species", Phys. Chem. Chem. Phys., vol. 2, 2000, pp. 367-372.

Meunier, et al., "Mechanistic Aspects of the Selective Reduction of NO By Propene over Alumina and Silver-Alumina Catalysts", Journal of Catalysis, vol. 187, 1999, pp. 493-505.

Hamada, et al., "Selective reduction of nitrogen monoxide with propane over alumina and HZSM-5 zeolite" "Effect of oxygen and nitrogen dioxide intermediate", Applied Catalysis, 70 (1991), L15-L20.

* cited by examiner

CATALYST AND METHOD FOR REDUCING NITROGEN OXIDES IN EXHAUST STREAMS WITH HYDROCARBONS OR ALCOHOLS

PRIORITY CLAIM

This application claims the benefit under 35 U.S.C. 119(e) of U.S. Provisional Application Ser. No. 60/657,500, filed Feb. 28, 2005.

FIELD OF THE INVENTION

The present invention relates to a catalyst and a method for selectively reducing nitrogen oxides in exhaust gases containing excess oxygen with hydrocarbons or oxygen-containing organic compounds.

BACKGROUND

Exhaust gas from internal combustion engines, power plants, industrial furnaces, heaters, diesel engines, and other devices contains nitrogen oxides, carbon monoxide, and unburned hydrocarbons. Exhaust gases from these sources also contain excess levels of oxygen, water vapor, and sulfur dioxide.

Emissions of nitrogen oxides, carbon monoxide, and hydrocarbons are subject to limits due to environmental regulations.

Nitrogen oxides from stationary and mobile sources are one of the causes of acid rain. Various methods have been proposed to reduce the nitrogen oxide emissions from exhaust gases.

Nitrogen oxides ($NO_2$ and $NO$, hereafter collectively referred to as $NO_x$) in exhaust gas from gasoline engines are normally removed by using three-way catalysts. Three-way catalysts are not effective in removing $NO_x$ from exhaust gas having high concentrations of oxygen, such as the exhaust gas from gas turbines, diesel engines, and gasoline engines operated in a lean burn mode, because there is not sufficient reducing agent in the exhaust gas to reduce the $NO_x$.

Typically, the exhaust gas from combustion devices that produce effluent gas containing excess oxygen is in the temperature range of 300 to 600° C. The exhaust gas contains oxygen, water vapor, small amounts of $SO_2$, carbon monoxide, unburned hydrocarbons, nitrogen, and $NO_x$. Selective reduction of $NO_x$ in this oxidizing environment is challenging.

The existing technologies for selectively reducing $NO_x$ in exhaust gas streams that contain excess oxygen cannot meet the future stringent emission standards. This has prompted intensive and extensive R&D activities for improved lean-$NO_x$ reduction technology.

Nitrogen oxides from large, stationary combustion sources such as power plants can be catalytically reduced with ammonia through the process of ammonia selective catalytic reduction (SCR).

Ammonia is toxic, however. The levels of ammonia that are introduced into the gas stream must be carefully controlled to avoid emitting excess ammonia into the atmosphere. Further, use of ammonia SCR generally requires large equipment, because the reactors and the control equipment in ammonia SCR applications are complex. Users of ammonia are also required to obtain special permits from local and federal authorities for the transportation, proper delivery and use of ammonia. Applications of ammonia SCR are therefore generally limited to large facilities such as power plants.

Nitrogen oxides can be reduced non-catalytically with reducing agents such as ammonia, hydrogen, carbon monoxide, or hydrocarbons. Because no catalyst is used, the reducing agent must be added in a larger amount than stoichiometric relative to the oxygen in the exhaust gas in order to effectively remove the $NO_x$. The non-catalytic method is therefore limited to exhaust gas having low oxygen levels. Few exhaust streams contain such low levels of oxygen.

Therefore, many attempts have been made to develop catalysts and methods that can reduce $NO_x$ in exhaust gas containing high oxygen content, water vapor, and sulfur dioxide by either using hydrocarbons that are present in the exhaust gas and/or by injecting hydrocarbons or alcohols into the exhaust gas to achieve $NO_x$ reduction in lean atmospheres.

Catalysts containing zeolites, with or without transition metals, have been used to selectively reduce $NO_x$ with hydrocarbons. Some references include: Iwamoto et al. (*Applied Catalysis* 70, L15 (1991)); Held et al. (Society of Automotive Engineers (SAE) Technical Paper, Ser. No. 900496 (1990)); Takeshina et al. (U.S. Pat. No. 5,017,538); U.S. Pat. No. 5,260,043 to Armor et al.; Hamon et al. (U.S. Pat. No. 6,063,351); J. N. Armor, (*Catalysis Today* 26, 147 (1995)); Hall et al. (U.S. Pat. No. 6,033,641); Feng and Hall, *Journal of Catalysis*, 166, 368 (1997); U.S. Pat. No. 6,645,448 to Cho et al.; Subbiah et al. (*Allied Catal. B: Environmental*, 42, 155 (2003); Li and Flytzani-Stephanopoulos (*Journal of Catalysis* 182, 313 (1999) and Applied *Catalysis B: Environmental* 22, 35 (1999)); A. P. Walker, *Catalysis Today* 26, 107 (1995b); J. N. Armor, Catalysis *Today* 26, 99 (1995); Traa et al. *Microporous and Mesoporous Materials* 30, 3 (1999); and J. N. Armor, *Catalysis Today* 31, 191 (1996). There is general agreement that, although zeolite-based formulations are promising, more work needs to be done to identify stable and durable catalysts that can selectively reduce $NO_x$ under lean conditions.

In contrast to the mixed results obtained for zeolite-based catalysts, there has been significant progress on non-zeolite based formulations for selective catalytic reduction of $NO_x$ using hydrocarbons under lean conditions, particularly for silver on alumina-type catalysts.

Some representative silver on alumina $NO_x$ reduction catalyst references include; Yoshida et al. (U.S. Pat. No. 5,714,432); Yoshida et al. (U.S. Pat. No. 5,534,237); Itoh et al. (U.S. Pat. No. 5,559,072); Kharas (U.S. Pat. No. 5,980,844); Yu et al., *Applied Catalysis B: Environmental* 49, 159, (2004); Bogdanchikova et al., *Applied Catalysis B: Environmental* 36, 287 (2002); Shibata et al., *Journal of Catalysis* 222, 386, (2004); Kameoka et al., *Physical Chemistry Chemical Physics* (PCCP) 2, 367 (2000); and Meunier et al., *Journal of Catalysis*, 187, 493 (1999).

It was shown in these reports that $NO_x$ and hydrocarbons react on silver/alumina catalysts to form several transient nitrogen-containing intermediates. Nitrogen can be formed from the nitrogen-containing intermediates in at least three ways: 1. from the reaction of the nitrogen-containing intermediates with one other; 2. from the reaction of the nitrogen-containing intermediates with $NO_x$, or 3. from the decomposition of the nitrogen-containing intermediates. The nitrogen-containing intermediates can be, for example, ammonia, organic nitrates, nitroso compounds, cyanates, isocyanates, etc. Most of these nitrogen-containing intermediates are toxic.

The hydrocarbon used for $NO_x$ reduction can undergo partial oxidation on the silver surfaces to form carbon monoxide. Carbon monoxide is a harmful pollutant. There is a need for a catalyst that selectively converts $NO_x$ to nitrogen without forming secondary emissions such as the previously described nitrogen-containing intermediates and/or carbon monoxide.

Researchers at Abo Akademi University in Finland (Eränen et al. *Journal of Catalysis*, 219, 25 (2003)) reported that 90% of the NO in an exhaust stream was converted to $N_2$ at 450° C. with a 2% silver/alumina catalyst using octane as a reductant. The mean conversion of NO in the temperature range of 300-600° C. was 66%. A considerable amount of carbon monoxide was generated, however.

Eränen et al. were able to oxidize the carbon monoxide to carbon dioxide by contacting the gas stream with a commercial oxidation catalyst placed after the silver/alumina catalyst. The oxidation catalyst converted 100% of the carbon monoxide in the temperature window from 150 to 6000° C.

Surprisingly, the NO conversion to $N_2$ at 450° C. declined from 90% with the silver/alumina catalyst alone to 45% with the combination of the silver/alumina catalyst and the commercial oxidation catalyst. The average NO conversion in the temperature interval of 300-600° C. fell from 66% with the silver/alumina catalyst to 32% with the combination of the silver/alumina catalyst and the commercial oxidation catalyst. Conversion of nitrogen to nitrogen oxides is not thermodynamically favorable in the 300-600° C. temperature range. Eränen et al. posed the question of how nitrogen can seemingly disappear from the exhaust gas with the combination of the silver/alumina catalyst and the commercial oxidation catalyst.

Eränen et al. performed an additional series of experiments in which the silver/alumina catalyst and the commercial oxidation catalyst were placed at various distances from one another. The conversion of NO to $N_2$ increased as the distance between the two catalysts increased. The best NO to $N_2$ conversion was achieved with a gap of 33 mm between the two catalysts.

The NO to $N_2$ conversion at 450° C. with a 33 mm gap was about 88%. By comparison, when the two catalysts were physically mixed, completely eliminating the gap, the NO to $N_2$ conversion was less than 10% over the entire temperature range of 150-600° C. Eränen et al. concluded that nitrogen-containing intermediates formed on the silver/alumina catalyst react with one another in the gas phase. They believed that providing a large gap between the two catalysts allows time for the intermediates to react with each other.

Although one could design a system with a large gap between the two catalysts, the resulting apparatus would be bulky. Further, there is no guarantee that the size of the gap that is required would remain constant from system to system.

Miyadera and Yoshida (U.S. Pat. Nos. 6,057,259 and 6,284,211) describe an exhaust gas cleaner and a method for removing $NO_x$ from an exhaust gas by bringing the exhaust gas into contact with the exhaust gas cleaner in the presence of oxygen-containing organic compounds. The exhaust gas cleaner contains a first catalyst containing silver and a second catalyst containing tungsten oxide or vanadium oxide. The second catalyst is capable of reducing the nitrogen oxides with ammonia generated by the first catalyst.

Vanadium oxide is toxic and is difficult to dispose. There is a need for a non-hazardous catalyst for selectively reducing $NO_x$ in the presence of reducing agents.

There is a need for a catalyst and a method for the selective reduction of $NO_x$ using hydrocarbons or alcohols as reducing agents, where the catalyst is able to convert $NO_x$ selectively to $N_2$ without forming secondary emissions such as carbon monoxide and/or toxic nitrogen-containing intermediates. There is also a need for a catalyst and a method for selectively reducing $NO_x$ with hydrocarbons or alcohols where the catalyst system does not rely on a gap between two catalysts, because the gap could lead to non-reproducibility or to a bulky system that is unsuitable for applications that are limited in terms of space. There is also a need for a catalyst and a method for selectively reducing $NO_x$ with hydrocarbons or alcohols where the catalyst system does not rely on a catalyst that contains hazardous components such as vanadium.

SUMMARY OF THE INVENTION

One aspect of the present invention involves a catalyst system for removing nitrogen oxides from an exhaust gas by reduction with a reducing agent selected from the group consisting of hydrocarbons and oxygen-containing organic compounds, where the exhaust gas contains nitrogen oxides and oxygen in an amount larger than a stoichiometric amount relative to unburned components in the exhaust gas. The catalyst system has an inlet side and an outlet side. The catalyst system comprises a first catalyst comprising approximately 0.2 to approximately 15 weight percent of at least one silver component selected from the group consisting of silver and silver compounds and at least one first inorganic oxide support, where the silver component is supported on the first inorganic oxide support.

The catalyst system also comprises a second catalyst comprising approximately 1 to approximately 30 weight percent of a modifier oxide selected from the group consisting of iron oxide, cerium oxide, copper oxide, manganese oxide, chromium oxide, a lanthanide oxide, an actinide oxide, molybdenum oxide, tin oxide, indium oxide, rhenium oxide, tantalum oxide, osmium oxide, barium oxide, calcium oxide, strontium oxide, potassium oxide, vanadium oxide, nickel oxide, tungsten oxide, and mixtures thereof and at least one second inorganic oxide support, where at least one of the second inorganic oxide supports is an acidic inorganic oxide support. The modifier oxide is supported on the second inorganic oxide support. The weight percent of the silver component is on the basis of silver metal relative to the weight of the first inorganic oxide support. The weight percent of the modifier oxide is on the basis of the corresponding metal relative to the weight of the second inorganic oxide support. The first catalyst and the second catalyst are disposed in that order from the inlet side to the outlet side of the catalyst system.

Advantageously, the second inorganic oxide support comprises at least one zeolite. In an embodiment, at least a portion of the zeolite is at least partially exchanged with at least one element selected from the group consisting of a Group 1A element, a Group 1B element, a Group IIA element, A Group IIB element, a Group IIIB element, a rare earth, and mixtures thereof. In an embodiment, at least a portion of the zeolite is in the ammonium form or the protonic form. Preferably, the zeolite is ZSM-5 or beta-zeolite. Advantageously, the zeolite is a mixture of ZSM-5 and beta-zeolite. In an embodiment, at least one of the first catalyst and the second catalyst may be supported on a substrate.

In an embodiment, at least one of the first catalyst and the second catalyst is formed into a shape. Advantageously, at least one of the first catalyst and the second catalyst may be an extruded catalyst. In an embodiment, the catalyst system may further comprise an oxidation catalyst, where the second catalyst is disposed between the first catalyst and the oxidation catalyst. Preferably, the second catalyst further comprises an oxygen storage material. Advantageously, the oxygen storage material is a cerium oxide-based material.

In an embodiment, the reducing agent may be ethanol. Advantageously, the exhaust gas contains approximately 1 to approximately 10,000 ppm $NO_x$. Preferably, the exhaust gas contains approximately 1 to approximately 50 ppm $NO_x$.

Another aspect of the present invention involves a method for removing nitrogen oxides from an exhaust gas by reduction with a reducing agent selected from the group consisting of hydrocarbons and oxygen-containing organic compounds, where the exhaust gas contains nitrogen oxides and oxygen in an amount larger than a stoichiometric amount relative to unburned components in the exhaust gas. The method comprises disposing a catalyst system according to the present invention in a flow path of the exhaust gas. The method also comprises introducing at least one reducing agent selected from the group consisting of hydrocarbons and oxygen-containing organic compounds into the exhaust gas on the inlet side of the catalyst system. The method further comprises bringing the resulting exhaust gas containing the reducing agent into contact with the catalyst system at a temperature of approximately 150° C. to approximately 650° C., thereby reacting the nitrogen oxides with the reducing agent to remove the nitrogen oxides by reduction.

Advantageously, the exhaust gas containing the reducing agent is brought into contact with the catalyst system at a temperature of approximately 300° C. to approximately 500° C.

Yet another aspect of the present invention involves an exhaust gas treatment apparatus comprising the catalyst system according to the present invention.

an exhaust gas source, a reservoir of reducing agent, and a means for introducing reducing agent from the reservoir into the exhaust gas generated by the exhaust gas source, where the exhaust gas contains nitrogen oxides and where the reducing agent is introduced into the exhaust gas on the inlet side of the catalyst system.

In an embodiment, the exhaust gas treatment apparatus may further comprise an oxidation catalyst, where the second catalyst is disposed between the first catalyst and the oxidation catalyst.

Another aspect of the present invention involves a modifier catalyst for converting nitrogen-containing intermediates generated by a selective catalytic reduction catalyst from a reducing agent and nitrogen oxides. The modifier catalyst comprises approximately 1 to approximately 30 weight percent of a modifier oxide selected from the group consisting of iron oxide, cerium oxide, copper oxide, manganese oxide, chromium oxide, a lanthanide oxide, an actinide oxide, molybdenum oxide, tin oxide, indium oxide, rhenium oxide, tantalum oxide, osmium oxide, barium oxide, calcium oxide, strontium oxide, potassium oxide, vanadium oxide, nickel oxide, tungsten oxide, and mixtures thereof The modifier catalyst also comprises at least one inorganic oxide support, where at least one of the inorganic oxide supports is an acidic inorganic oxide support.

The modifier oxide is supported on the inorganic oxide support. The weight percent of the modifier oxide is on the basis of the corresponding metal relative to the weight of the inorganic oxide support.

Yet another aspect of the present invention involves a method for removing nitrogen oxides from an exhaust gas by reduction with a reducing agent selected from the group consisting of hydrocarbons and oxygen-containing organic compounds. The method comprises disposing the catalyst system according to the present invention in a flow path of the exhaust gas. The method also comprises introducing at least one reducing agent selected from the group consisting of hydrocarbons and oxygen-containing organic compounds into the exhaust gas on the inlet side of the catalyst system.

The method also comprises bringing the resulting exhaust gas containing the reducing agent into contact with the catalyst system at a temperature of approximately 150° C. to approximately 650° C., thereby reacting the nitrogen oxides with the reducing agent to remove the nitrogen oxides by reduction.

Another aspect of the present invention involves a method for converting nitrogen-containing intermediates into nitrogen. The method comprises contacting the nitrogen-containing intermediates with the modifier catalyst of the present invention.

Another aspect of the present invention involves a modifier catalyst for converting at least one of carbon monoxide and hydrocarbons generated by a selective catalytic reduction catalyst from a reducing agent and nitrogen oxides or generated by an engine. The modifier catalyst is the modifier catalyst or second catalyst according to the present invention.

Another aspect of the present invention involves a method for converting at least one of carbon monoxide and hydrocarbons in a gas stream generated by a selective catalytic reduction catalyst from a reducing agent and nitrogen oxides or generated by an engine. The method comprises contacting the gas stream with the modifier catalyst according to the present invention.

Yet another aspect of the present invention involves a sulfur-tolerant modifier catalyst for converting at least one of nitrogen-containing intermediates, carbon monoxide and hydrocarbons generated by a selective catalytic reduction catalyst from a reducing agent and nitrogen oxides or generated by an engine. The catalyst comprises the modifier catalyst according to the present invention.

Another aspect of the present invention involves a catalyst system for removing nitrogen oxides from an exhaust gas by reduction with a reducing agent selected from the group consisting of hydrocarbons and oxygen-containing organic compounds. The catalyst system comprises the catalyst system according to the present invention.

Another aspect of the present invention involves a catalyst system for removing nitrogen oxides from an exhaust gas by reduction with a reducing agent selected from the group consisting of hydrocarbons and oxygen-containing organic compounds. The catalyst system comprises the catalyst system according to the present invention.

BRIEF DESCRIPTION OF THE DRAWINGS

FIG. 3 is a series of graphs of $NO_x$ conversion versus temperature in degrees Centigrade with a feedgas containing 25 ppm $NO_x$ and 250 pm ethanol for:

Figure 4:
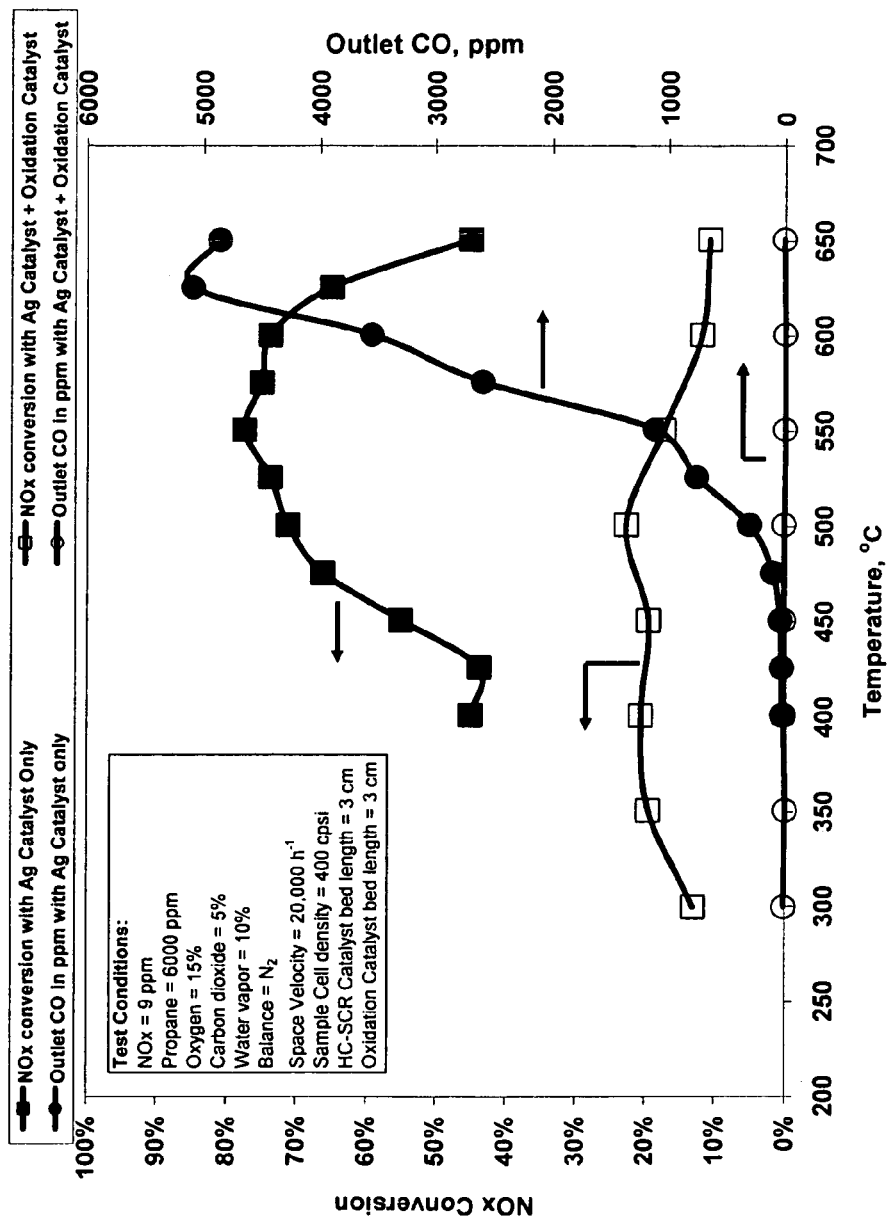
Figure 5:
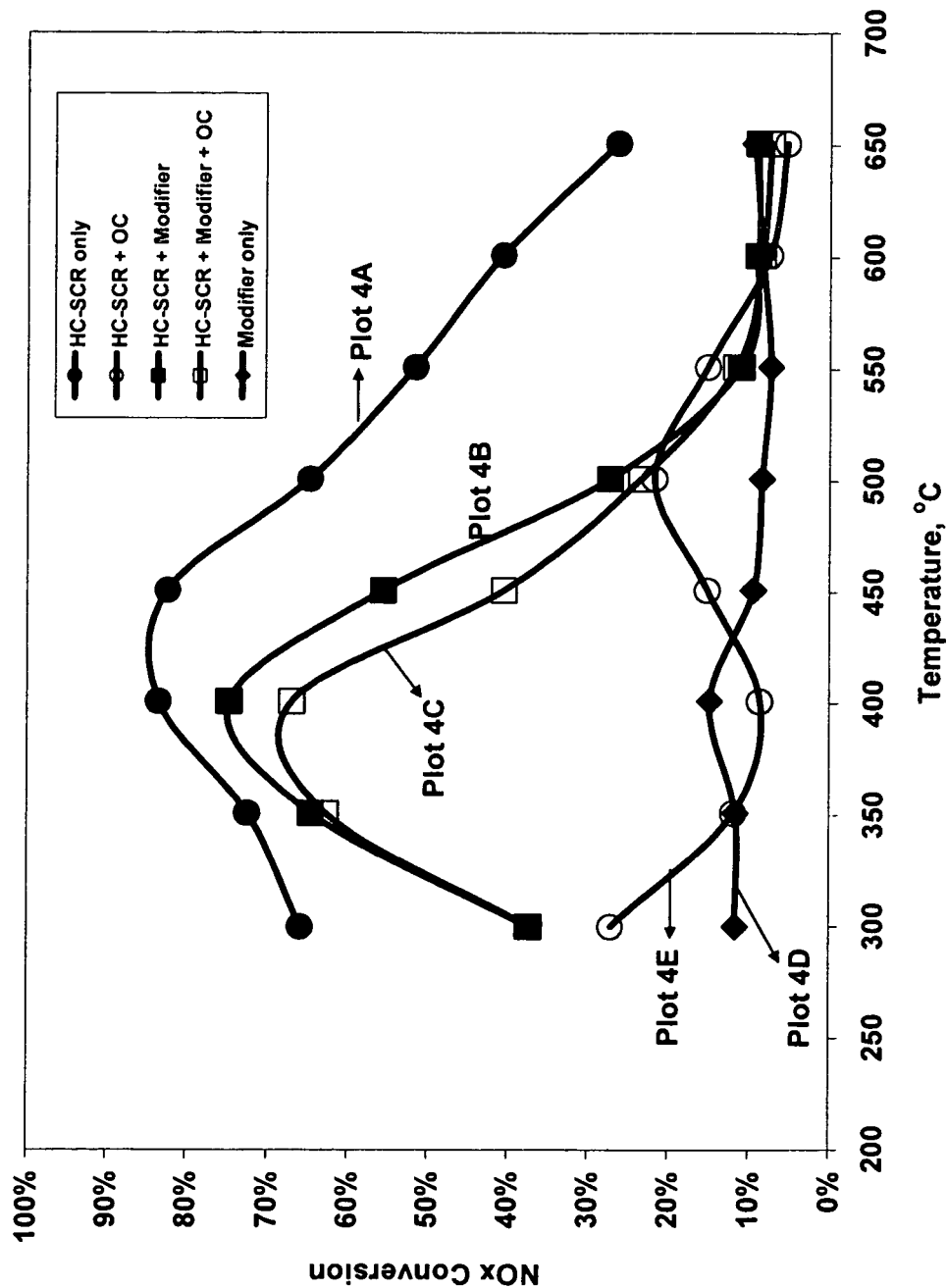
Figure 6:
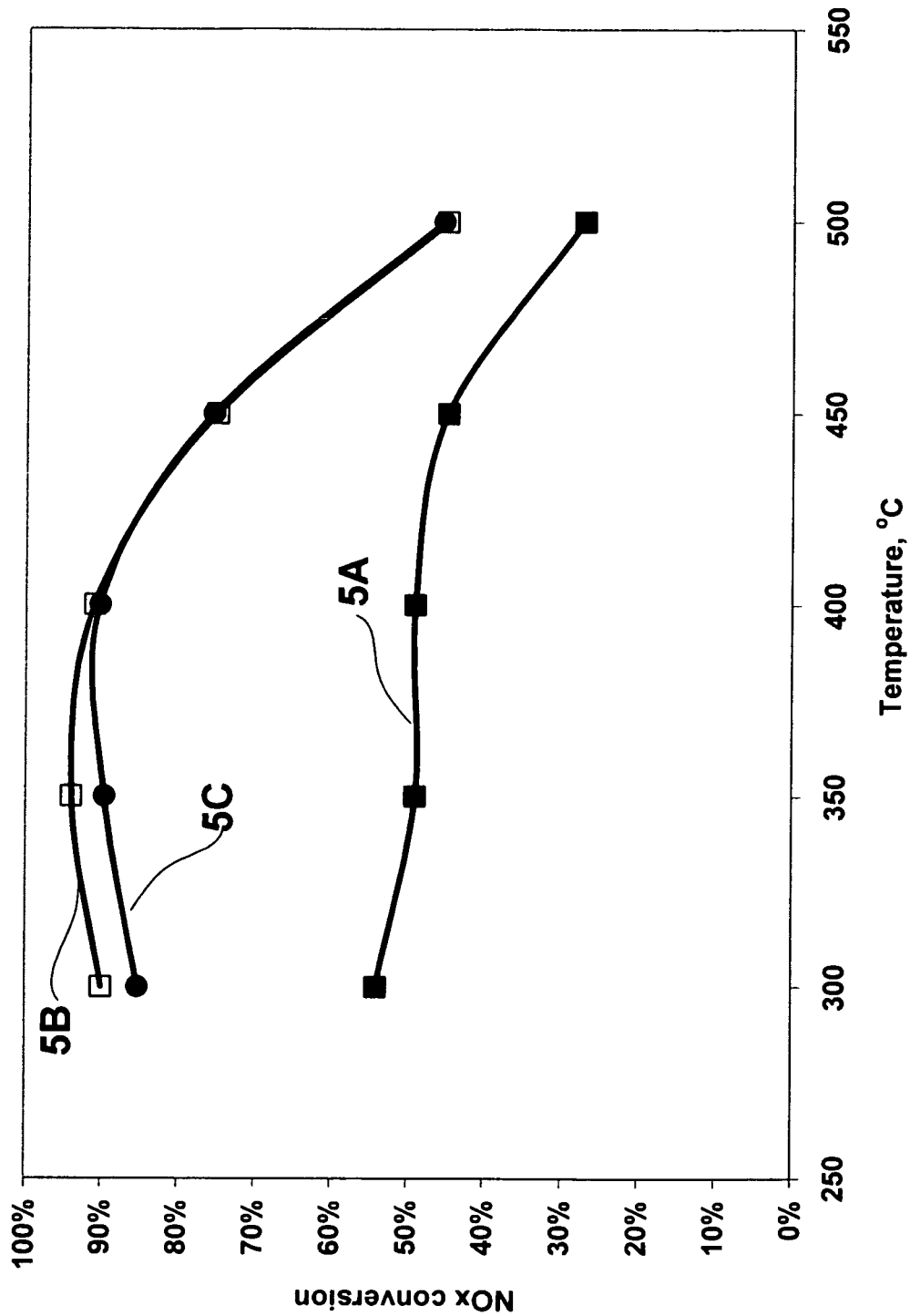
Figure 7:
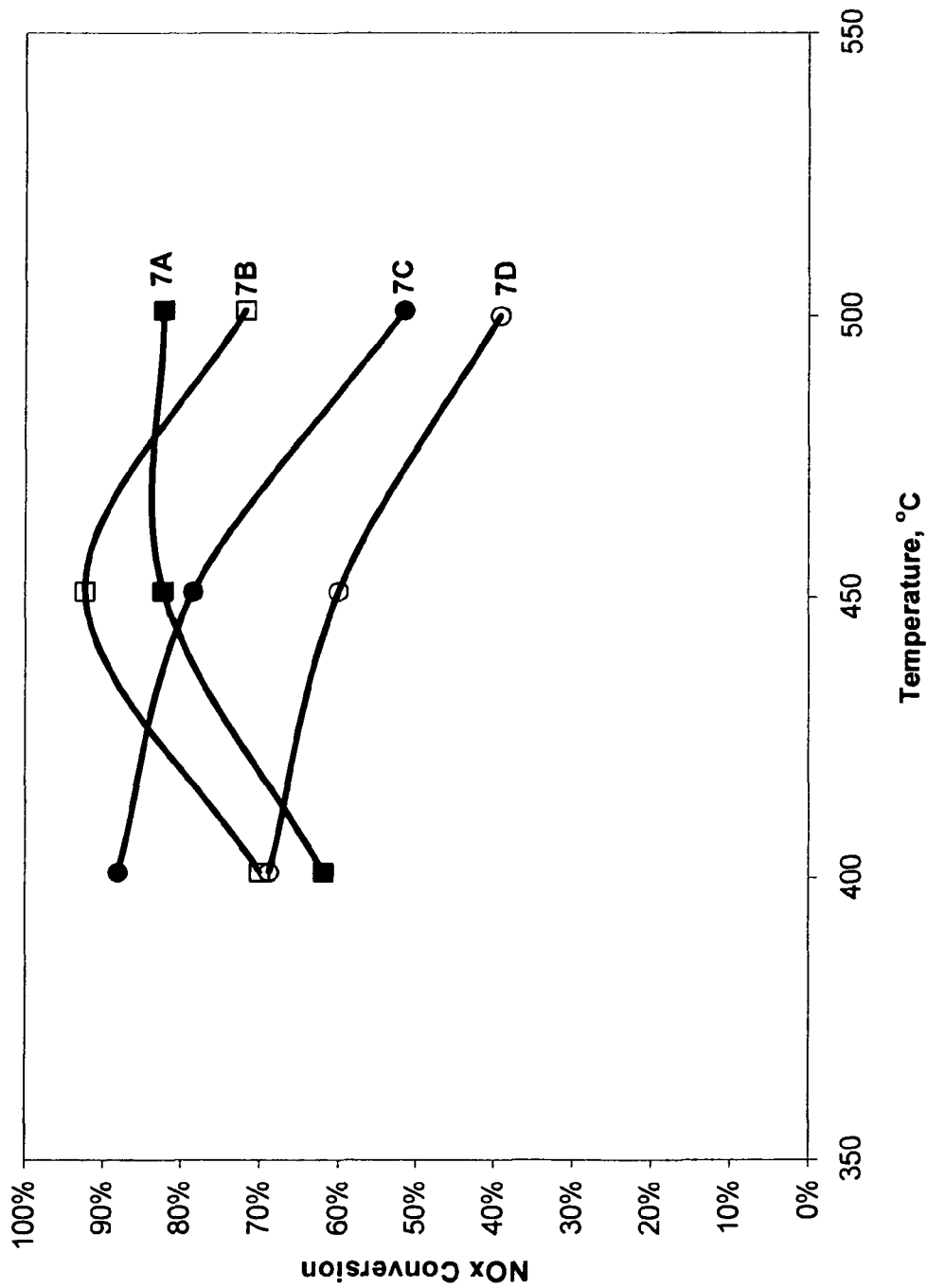
Figure 8:
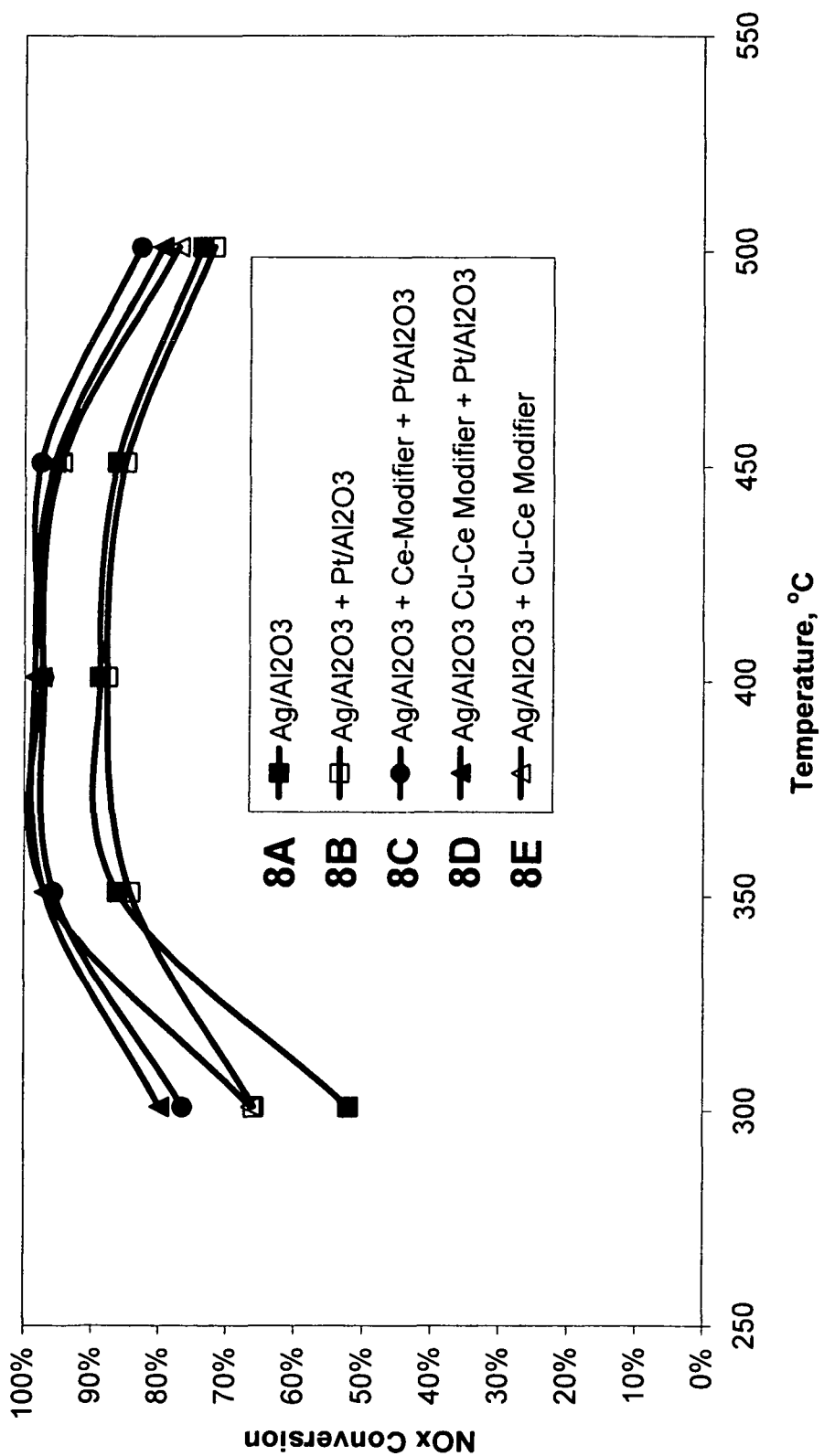
Figure 9:
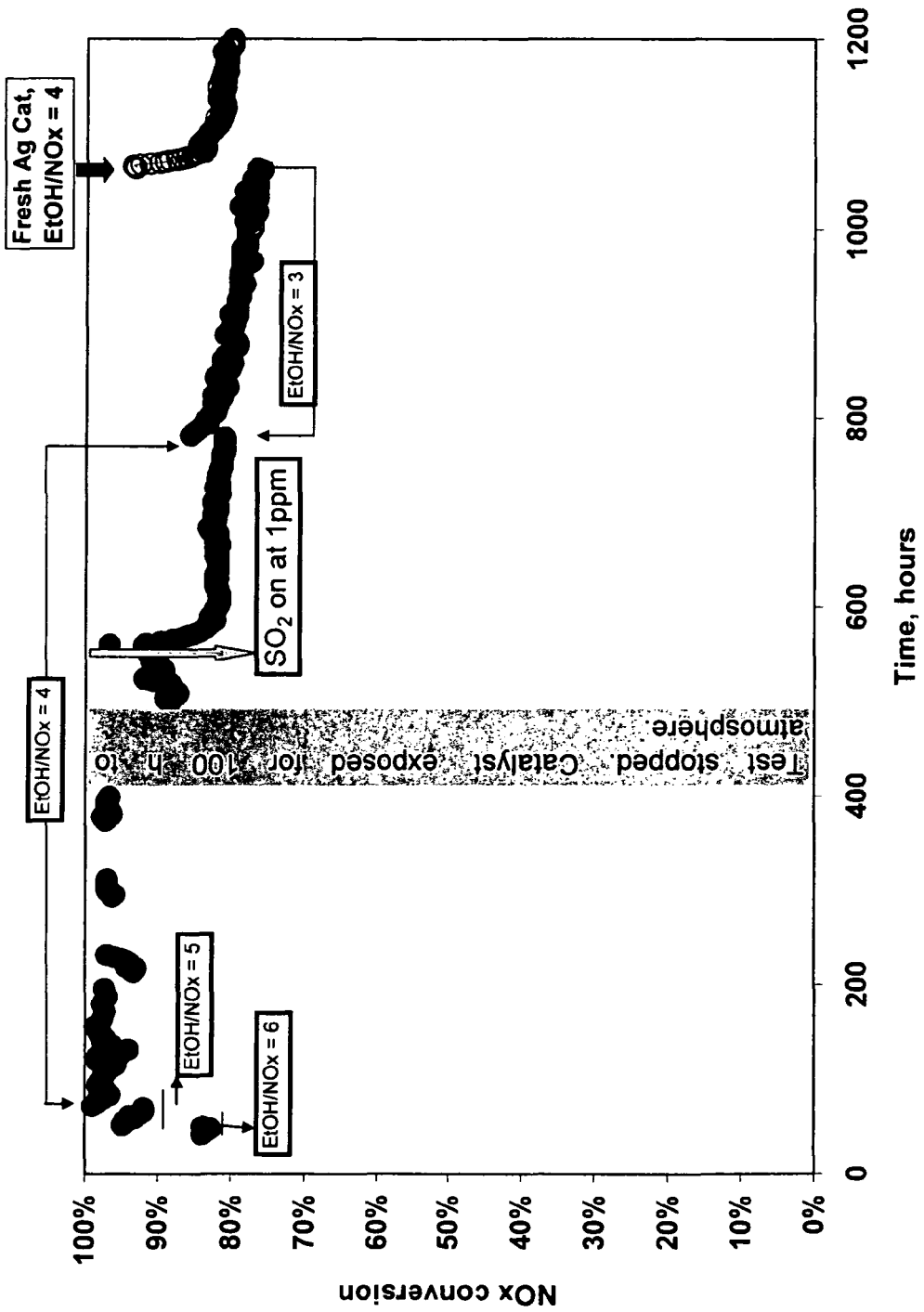

2A a silver/$Al_2O_3$ washcoated catalyst;
2B a silver/$Al_2O_3$ washcoated catalyst and an oxidation catalyst;
2C a silver/$Al_2O_3$ impregnated catalyst; and
2D a silver/$Al_2O_3$ impregnated catalyst and an oxidation catalyst;

FIG. 4 is a series of graphs of $NO_x$ conversion (left hand axis) and outlet CO in ppm (right hand axis) versus temperature in degrees Centigrade with an inlet gas that contains 9 ppm NO$_x$ and 6000 ppm propane for a silver/Al$_2$O$_3$ catalyst and for a catalyst system that contains a silver Al$_2$O$_3$ catalyst and an oxidation catalyst;

FIG. 5 is a series of graphs of NO$_x$ conversion versus temperature in degrees Centigrade with a feedgas containing 9 ppm NO$_x$ and 2250 ppm ethanol for:

4A a silver/Al$_2$O$_3$ catalyst;

4B a silver/Al$_2$O$_3$ catalyst and an iron modifier catalyst;

4C a catalyst system containing a silver/Al$_2$O$_3$ catalyst, an iron modifier catalyst, and an oxidation catalyst;

4D an iron modifier catalyst; and 4E a silver/Al$_2$O$_3$ catalyst and an oxidation catalyst;

FIG. 6 shows a series of graphs of NO$_x$ conversion versus temperature in degrees Centigrade with a feedstream containing 25 ppm NO$_x$ and 250 ppm ethanol for:

5A a silver/Al$_2$O$_3$ catalyst and an oxidation catalyst;

5B a catalyst system containing a silver/Al$_2$O$_3$ catalyst, Cerium-based Modifier Catalyst 1, and an oxidation catalyst; and 5C a catalyst system containing a silver/Al$_2$O$_3$ catalyst, Cerium-based Modifier Catalyst 2, and an oxidation catalyst;

FIG. 7 is a series of plots of NO$_x$ conversion versus temperature in degrees Centigrade with a feedstream containing 25 ppm NO$_x$ and 300 ppm isopropyl alcohol for:

7A a catalyst system containing a silver/Al$_2$O$_3$ catalyst, a cerium on mixed washcoat modifier catalyst, and an oxidation catalyst;

7B a catalyst system containing a silver/Al$_2$O$_3$ catalyst, an iron on mixed washcoat modifier catalyst, and an oxidation catalyst;

7C a catalyst system containing a silver/Al$_2$O$_3$ catalyst, a cerium and copper on mixed washcoat modifier catalyst, and an oxidation catalyst; and 7D a catalyst system containing a silver/Al$_2$O$_3$ catalyst, a copper on mixed washcoat modifier catalyst, and an oxidation catalyst;

FIG. 8 is a series of plots of NO$_x$ conversion versus temperature in degrees Centigrade with a feedstream containing 500 ppm NO$_x$ and 600 ppm ethanol for:

8A a silver/Al$_2$O$_3$ catalyst;

8B a silver/Al$_2$O$_3$ catalyst and an oxidation catalyst;

8C a catalyst system containing a silver/Al$_2$O$_3$ catalyst, a cerium modifier catalyst, and an oxidation catalyst;

8D a catalyst system containing a silver/Al$_2$O$_3$ catalyst. a copper and cerium modifier catalyst, and an oxidation catalyst; and 8E a silver/Al$_2$O$_3$ catalyst and a copper and cerium modifier catalyst;

FIG. 9 is a plot of NO$_x$ conversion versus time in hours for a long term activity test at 400° C. with a catalyst system containing a silver/Al$_2$O$_3$ catalyst, Cerium-based Modifier Catalyst 1, and an oxidation catalyst with a feedstream containing 25 ppm NO$_x$, varying ratios of ethanol/NO$_x$, and 1 ppm SO$_2$, where the SO$_2$ is introduced starting at 550 hours.

DETAILED DESCRIPTION OF THE PREFERRED EMBODIMENT

Silver/alumina catalysts are effective catalysts for the selective catalytic reduction (SCR) of NO$_x$ with hydrocarbons or oxygen-containing organic compounds as reducing agents. In the following discussion, the term alcohol is to be understood as being a generic term for "oxygen-containing organic compound". The term alcohol is not meant to be limited to alcohols alone but includes a variety of oxygen-containing organic compounds such as, but not limited to, alcohols, ketones, aldehydes, carboxylic acids, ethers, and the like.

NO$_x$ reacts with hydrocarbons or alcohols on silver surfaces to form N$_2$, H$_2$O, CO$_2$, CO, and nitrogen-containing intermediates such as ammonia, nitrates, cyanates and isocyanates. The nitrogen-containing intermediates and carbon monoxide formed during the SCR process are toxic.

Eränen et al. found that oxidizing the carbon monoxide to carbon dioxide with a commercial oxidation catalyst decreases the conversion of nitrogen oxides to nitrogen. They also demonstrated that providing a gap between the silver/alumina catalyst and the oxidation catalyst increases the conversion of nitrogen oxides to nitrogen.

Although not wishing to be limited by a theory, it is believed that the silver/alumina catalyst catalyzes the conversion of nitrogen oxides to nitrogen with hydrocarbon or oxygen-containing organic compound (shortened to alcohol in the discussion below) reducing agents through the following reactions:

1. Hydrocarbon or alcohol+NO$_x$→Nitrogen-containing intermediates.
2. Nitrogen-containing intermediates+NO$_x$→N$_2$
3. Nitrogen-containing intermediates→N$_2$ It is believed that contacting the nitrogen oxides with hydrocarbon or alcohol reducing agents in the presence of the silver/alumina catalyst converts at least part of the nitrogen oxides into nitrogen-containing intermediates. The nitrogen-containing intermediates can react with NO$_x$ to form N$_2$ through reaction 2, or they can decompose to N$_2$, as shown in reaction 3.

If an oxidation catalyst is added to the system to oxidize byproduct carbon monoxide to carbon dioxide, the nitrogen-containing intermediates would be oxidized to nitrogen oxides, carbon dioxide and water over the oxidation catalyst. Oxidation of the nitrogen-containing intermediates would eliminate the formation of nitrogen though reactions 2 and 3. The presence of the oxidation catalyst would therefore lessen the conversion of nitrogen oxides to nitrogen, consistent with the observations of Eränen et al.

The reaction scheme of reactions 1-3 also provides an explanation for the higher conversion of nitrogen oxides to nitrogen observed by Eränen et al. when there was a gap between the silver/alumina selective reduction catalyst and the oxidation catalyst. The gap between the two catalysts provides time for the nitrogen-containing intermediates formed over the silver/alumina catalyst to form nitrogen via reactions 2 or 3.

Relying on a gap between the silver/alumina catalyst and the oxidation catalyst to convert NO$_x$ to N$_2$ is unreliable and inefficient, because the size of the gap that is required for reactions 2 and 3 to occur may vary, depending on the reaction conditions. The gap also increases the size of the reactor.

Relying on a gap to convert the nitrogen-containing intermediates to N$_2$ is even more unfavorable when the concentration of NO$_x$ in the exhaust gas is low. Nitrogen-containing intermediates are formed from the reaction of hydrocarbons or alcohols with NO$_x$, as shown in reaction 1. The rate of formation of nitrogen-containing intermediates with a gas stream containing low concentrations of NO$_x$ would be low, because the formation of the nitrogen-containing intermediates depends on the presence of NO$_x$.

The nitrogen-containing intermediates react with NO$_x$ to form N$_2$ through reaction 2. The concentrations of both reactants in reaction 2 depend on the concentration of NO$_x$. The first reactant, the nitrogen-containing intermediate, is formed from the reaction of hydrocarbons or alcohols with NO$_x$. The second reactant is $NO_x$. The concentration of both reactants depends on the presence of $NO_x$. Low concentrations of $NO_x$ in the exhaust gas would therefore be especially unfavorable for the rate of reaction 2.

The off gas from gas turbines contains only about 25 ppm of $NO_x$. Conversion of such low concentrations of $NO_x$ is difficult. If conventional silver catalysts were able to convert such low levels of $NO_x$ at all, they would only catalyze reaction 1, the formation of the nitrogen-containing intermediates.

Example 1 and 8 below describe experiments in which the concentration of $NO_x$ in the feedgas was approximately 500 ppm. As shown in the examples, the conversion of $NO_x$ to nitrogen at such a high $NO_x$ concentration may be fairly high, even when a low ratio of reducing agent to $NO_x$ is used.

Examples 2, 5-7 and 9 describe experiments in which the concentration of $NO_x$ in the feedgas was only 25 ppm. Examples 3 and 4 describe experiments in which the feed stream had only 9 ppm $NO_x$. As shown in the examples, the conversion of $NO_x$ to nitrogen on a silver catalyst alone was significantly lower than when the $NO_x$ concentration in the feedgas was 500 ppm, as described in Examples 1 and 8. In addition, when the $NO_x$ concentrations are lower, excess reductant is required to achieve high $NO_x$ conversion, unlike the case when the $NO_x$ concentration in the feedgas was 500 ppm.

Although not wishing to be bound to a theory, it is believed that, when the $NO_x$ concentration in the feedgas is high, the concentration of nitrogen-containing intermediates in the exhaust gas may be high enough that the nitrogen-containing intermediates can react with $NO_x$ or with each other to produce nitrogen through reactions 2 or 3 above, resulting in $NO_x$ conversion to nitrogen.

At the low $NO_x$ levels of Examples 2-7 and 9, the silver catalyst was only able to facilitate the reaction between $NO_x$ and the reductant, leading to the formation of a small amount of nitrogen-containing intermediates, and only with a large excess of reductant. The concentration of nitrogen-containing intermediates in the feedgas after passing over the silver catalyst may be too low to allow significant conversion of the nitrogen-containing intermediates to nitrogen through reactions 2 and 3. The conversion of $NO_x$ to nitrogen may therefore be significantly lower with feedgases that contain low levels of $NO_x$ than with feedgases that contain high levels of $NO_x$.

Also, as shown in the examples, the use of a silver catalyst alone resulted in a significant amount of carbon monoxide formation.

In an embodiment, a catalyst system for removing nitrogen oxides from an exhaust gas with a reducing agent includes a first catalyst and a second catalyst, where the first catalyst and the second catalyst are disposed in that order from an inlet side to an outlet side of the catalyst system. The first catalyst is a silver-based catalyst, and the second catalyst is a modifier catalyst.

As shown in the examples below, the catalyst system containing a combination of the silver catalyst and the modifier catalyst may convert more $NO_x$ to $N_2$ than the silver catalyst alone. Although not wishing to be limited by a theory, it is believed that the modifier catalyst according to embodiments of the present invention may catalyze the conversion of the nitrogen-containing intermediates to nitrogen.

The modifier catalyst according to embodiments of the present invention replaces the gap of Eränen et al. Converting the nitrogen-containing intermediates to nitrogen with the active modifier catalyst through reactions 2 and 3 is more reproducible than relying on the passive gap of Eränen et al.

The active modifier catalyst according to embodiments of the present invention may also provide higher conversion of the nitrogen-containing intermediates than the passive gap provided by Eränen et al. A reactor that uses the modifier catalyst may be more compact than an apparatus that relies on the gap of Eränen et al.

The catalyst system according to an embodiment of the present invention may be effective at converting $NO_x$ to $N_2$ even when the concentration of $NO_x$ in the exhaust gas is low, as is the case, for example, for the exhaust gas from gas turbines. The embodiment of the catalyst system comprising the silver catalyst and the modifier catalyst according to embodiments of the present invention is not limited in application to exhaust gases containing low concentrations of $NO_x$, however. The catalyst system may also be effective at catalyzing conversion of $NO_x$ in exhaust gases that contain high concentrations of $NO_x$. For the purpose of the present invention, the concentration range of $NO_x$ may be between 1 to 10,000 ppm. In one embodiment, it is between 1 to about 50 ppm.

The modifier catalyst according to embodiments of the present invention may have several advantages over the gap of Eränen et al. beyond providing higher $NO_x$ conversion and greater reproducibility than the gap.

The nitrogen-containing intermediates that are formed on the silver catalyst may be compounds such as organic nitrates, cyanates, cyanides, isocyanates, etc. Many of these compounds are toxic. The modifier catalyst according to embodiments of the invention may convert the toxic nitrogen-containing intermediates to nitrogen, thereby eliminating the toxicity of the exhaust gas.

The modifier catalyst can also convert the carbon monoxide and hydrocarbons in the exhaust gas to carbon dioxide and water. The presence of carbon monoxide and hydrocarbons in the exhaust gas is a pollution issue. The presence of hydrocarbons in the exhaust gas after the exhaust gas contacts the silver catalyst is due to incomplete conversion of the hydrocarbons. The presence of hydrocarbons in the exhaust gas after contacting the silver catalyst has been termed "hydrocarbon slippage". Hydrocarbon slippage is undesirable, because the hydrocarbons in the exhaust gas can cause emission problems. The carbon monoxide and hydrocarbons in the exhaust stream may be oxidized over the modifier catalyst, potentially decreasing the size of the oxidizer catalyst or even eliminating the need for having a separate oxidation catalyst to convert carbon monoxide and hydrocarbons.

The first catalyst contains at least one silver component supported on at least one first inorganic oxide support. The silver component may be silver metal or silver compounds. The first inorganic oxide support may be alumina, silica, titania, zirconia, zeolites, or composite oxides thereof.

In an embodiment, the second catalyst, the modifier catalyst, comprises a modifier oxide selected from the group consisting of iron oxide, cerium oxide, copper oxide, manganese oxide, chromium oxide, a lanthanide oxide, an actinide oxide, molybdenum oxide, tin oxide, indium oxide, rhenium oxide, tantalum oxide, osmium oxide, barium oxide, calcium oxide, strontium oxide, potassium oxide, vanadium oxide, nickel oxide, tungsten oxide, and mixtures thereof. The modifier oxide is supported on the second inorganic oxide support, where at least one of the second inorganic oxide supports is an acidic inorganic oxide support. In an embodiment, the acidic inorganic oxide is at least one inorganic oxide selected from the group consisting of titania-zirconia, zirconia-alumina, sulphated zirconia, phosphated zirconia, tungstated zirconia, silica-alumina, a zeolite, and mixtures thereof.

Silver Catalyst

The first catalyst, the silver catalyst, contains at least one silver component selected from the group consisting of silver and silver compounds and at least one first inorganic oxide support. Suitable silver compounds include, but are not limited to, silver halides, silver oxides, silver nitrates, silver phosphates, or silver sulfates. Silver halides can include silver chlorides, silver bromides, silver iodides, silver fluorides, or mixtures thereof.

The first inorganic oxide support may be an oxide selected from the group consisting of alumina, silica, titania, zirconia, composite oxides thereof, a zeolite, and mixtures thereof. Zeolites are crystalline silica aluminas. In an embodiment, the first inorganic oxide support is alumina.

The amount of the silver component that is supported on the first inorganic oxide support is approximately 0.2 to approximately 10 weight percent, more preferably approximately 0.5 to approximately 5 weight percent, and most preferably from approximately 0.5 to approximately 2 weight percent. The weight percent of silver is on the basis of the metal as a percent of the weight of the first inorganic oxide support or supports.

If the amount of silver in the silver catalyst is less than approximately 0.2 weight percent, the $NO_x$ removal from the exhaust gas may be low. If the amount of silver in the silver catalyst is greater than approximately 10 weight percent, the hydrocarbon or alcohol reducing agents in the exhaust gas may be oxidized, resulting in low $NO_x$ conversion.

A silver catalyst can be prepared by placing a silver compound on an inorganic oxide support by impregnating the inorganic oxide support with a solution of a silver compound. Alternatively, a solution of a precursor of the inorganic oxide support may be mixed with a solution of the silver compound, and the combined solution of the silver compound and the precursor of the inorganic oxide support may be co-impregnated into a support. Calcination of the support and the combined solution of the silver compound and the precursor of the inorganic oxide support forms the silver catalyst.

In an alternative embodiment, a solution of the silver compound and the precursor of the inorganic oxide support may be calcined to form the silver catalyst, where the precursor of the inorganic oxide support forms the support when calcined.

Silver catalysts prepared by the different methods can have different activities and/or selectivities for the reduction of nitrogen oxides with reducing agents such as alcohols or hydrocarbons. The modifier catalyst according to embodiments of the invention should be effective at converting the nitrogen-containing intermediates to nitrogen, regardless of how the first catalyst, the silver catalyst, is prepared.

Modifier Catalyst:

In an embodiment, the second catalyst is a modifier catalyst, where the modifier catalyst contains approximately 1-30 weight percent of a modifier oxide selected from the group selected from the group consisting of iron oxide, cerium oxide, copper oxide, manganese oxide, chromium oxide, a lanthanide oxide, an actinide oxide, molybdenum oxide, tin oxide, indium oxide, rhenium oxide, tantalum oxide, osmium oxide, barium oxide, calcium tungsten oxide, and mixtures thereof supported on at least one second inorganic oxide support, where at least one of the second inorganic oxide supports is an acidic inorganic oxide support.

The modifier catalyst may contain from approximately 1 to approximately 30 weight percent of the modifier oxide supported on the second inorganic oxide support, where the weight percent of the modifier oxide is on the basis of the corresponding metal compared to the combined weight of the second inorganic oxide supports.

More preferably, the modifier catalyst may contain from approximately 1 wt percent to approximately 20 weight percent of the modifier oxide on the second inorganic oxide support, and most preferably approximately 1 to approximately 10 weight percent of the modifier oxide on the second inorganic oxide support. Mixtures of modifier oxides may also be suitable.

In an embodiment, the modifier catalyst may comprise iron oxide as the modifier oxide. In an alternative embodiment, the modifier catalyst may comprise cerium oxide as the modifier oxide. In yet another embodiment, the modifier catalyst may comprise a mixture of copper oxide and cerium oxide as modifier oxides. In another embodiment, the modifier catalyst may comprise a mixture of copper oxide, manganese oxide, and cerium oxide as modifier oxides.

The second inorganic oxide support may be at least one oxide selected from the group consisting of alumina, silica, zirconia, titania, composite oxides thereof, a zeolite, and mixtures thereof. Zeolites are crystalline silica aluminas. At least one of the second inorganic oxide supports is an acidic inorganic oxide support. The inorganic oxide supports may be commercially available materials. In an alternative embodiment, the inorganic oxide supports may be prepared from suitable precursors. For example, the inorganic oxide support may be prepared by hydrolyzing alkoxides. Other suitable methods of preparing inorganic oxide supports are well-known to those skilled in the art.

In an embodiment, the acidic inorganic oxide support is selected from the group consisting of silica alumina, titania-zirconia, alumina-zirconia, tungstated zirconia, sulfated zirconia, phosphated zirconia, aluminophosphates (ALPOs), silicoaluminophosphates (SAPOs), a zeolite, and mixtures thereof. The zeolite or zeolites may be any suitable zeolite. Suitable zeolites include, but are not limited to zeolite-A, chabazite, EMT zeolite, Y-zeolite, X-zeolite, L-zeolite, mordenite, ferrierite, ZSM-5, ZSM-11, and beta-zeolite, and mixtures thereof. Preferably, at least a portion of the zeolite or mixture of zeolites is in the H or ammonium form. In an embodiment, at least a portion of the zeolite is at least partially exchanged with at least one element from the periodic table in Group IA, IB, IIA, IIB, IIIB, the rare earths, and mixtures thereof.

In an embodiment, the zeolite is selected from the group consisting of ZSM-5, ZSM-11, beta-zeolite, mordenite, ferrierite, Y-zeolite, X-zeolite, and mixtures thereof.

In an embodiment, the modifier catalyst further comprises an oxygen storage material, where the oxygen storage material is a cerium oxide-based material. The oxygen storage material can supply oxygen to rich exhaust gas and take up oxygen from lean exhaust gas, buffering the catalyst against the fluctuating supply of oxygen in the feed gas. The cerium oxide-based oxygen storage material can also act as a support for the modifier catalyst components. If the cerium oxide-based material is a support for the modifier catalyst components, the cerium oxide-based material may be one of the second inorganic oxide supports in addition to being an oxygen storage material.

In an embodiment, the second inorganic oxide support may contain approximately 40 weight percent alumina, approximately 50 weight percent zeolite, and approximately 10 weight percent oxygen storage material. The zeolite can be 100% ZSM-5, a combination of ZSM-5 and beta zeolite, or any other suitable zeolite or mixture of zeolites. In an embodiment where the mixture of zeolites is a mixture of beta zeolite and ZSM-5, the ratio of beta zeolite to ZSM-5 can be 0 to 1. The zeolite(s) can be in the ammonium form, the protonic form (H-form), or can be completely or partially exchanged with at least one element selected from the group consisting of a Group IA element, a Group IB element, a Group IIA element, a Group IIB element, a Group IIIB element, a rare earth, and mixtures thereof. The oxygen storage material can be $CeO_2$, $Ce_{1-\square}Zr_{\square}O_2$, a ceria-zirconia doped with a lanthanide or a mixture of lanthanides, or any combination thereof.

Substrate:

Either or both of the first and second catalysts may be supported on a substrate. As used herein, a substrate is any support structure known in the art for supporting catalysts. In one embodiment of the present invention, the substrate is in the form of beads or pellets. The beads or pellets may be formed from alumina, silica alumina, silica, titania, mixtures thereof, or any suitable material. In an embodiment, the substrate is a honeycomb support. The honeycomb support may be a ceramic honeycomb support or a metal honeycomb support. The ceramic honeycomb support may be formed, for example, from sillimanite, zirconia, petalite, spodumene, magnesium silicates, silicon carbide, mullite, alumina, mullite, cordierite ($Mg_2Al_4Si_5O_{18}$), other alumino-silicate materials, or combinations thereof. Other ceramic and metallic supports such as reticulated foams are also suitable.

If the support is a metal honeycomb support, the metal may be a heat-resistant base metal alloy, particularly an alloy in which iron is a substantial or major component. The surface of the metal support may be oxidized at elevated temperatures above about 1000° C. to improve the corrosion resistance of the alloy by forming an oxide layer on the surface of the alloy. The oxide layer on the surface of the alloy may also enhance the adherence of a washcoat to the surface of the monolith support. Preferably, all of the substrate supports, either metallic or ceramic, offer a three-dimensional support structure.

In one embodiment of the present invention, the substrate may be a monolithic carrier having a plurality of fine, parallel flow passages extending through the monolith. The passages can be of any suitable cross-sectional shapes and sizes. The passages may be, for example, trapezoidal, rectangular, square, sinusoidal, hexagonal, oval, or circular, although other shapes are also suitable. The monolith may contain from about 10 to about 1200 or more gas inlet openings or passages per square inch of cross section, although fewer passages may be used. In an embodiment, the monolith has approximately 400 gas inlet openings per square inch of cross section.

In an embodiment, the first inorganic oxide support and/or the second inorganic oxide support and/or the other components of the first and/or the second catalysts may be placed on the substrate as a washcoat. A washcoat may be formed by suspending the components of the catalyst in water to form an aqueous slurry, and washcoating the aqueous slurry onto the substrate. The slurry may be deposited onto the substrate in any suitable manner. For example, the substrate may be dipped into the slurry, or the slurry may be sprayed onto the substrate. Other methods of depositing the slurry onto the substrate known to those skilled in the art may be used in alternative embodiments. If the substrate is a monolithic carrier with parallel flow passages, the washcoat may be formed on the walls of the passages. Gas flowing through the flow passages contacts the washcoat on the walls of the passages as well as materials that are supported on the washcoat.

Other components such as acid or base solutions or various salts or organic compounds may be added to the aqueous slurry to adjust the rheology of the slurry. Some examples of compounds that can be used to adjust the rheology include, but are not limited to, tetraethylammonium hydroxide, other tetralkylammonium salts, ammonium acetate, ammonium citrate, glycerol, commercial polymers such as polyethylene glycol, and other suitable polymers. The oxygen storage material, if present, may also improve the rheology of the aqueous slurry. The enhanced rheology of the washcoat slurry that may be due to the presence of the oxygen storage material or the other rheology additives may enhance the adhesion of the washcoat slurry to the substrate.

In an embodiment, the silver component of the first catalyst or the modifier oxide of the second catalyst may be added to the aqueous slurry as oxides or as precursors of oxides, for example nitrates, acetates or other salts and/or mixtures of thereof.

In an exemplary embodiment of the present invention, a washcoat may be formed by slurry depositing the first inorganic oxide support or the second inorganic oxide support and optionally the zeolite and/or the oxygen storage material onto the substrate A solution comprising water-soluble precursor salts of the silver component (for the first catalyst) or water-soluble salts of the modifier oxide (for the second catalyst) may be impregnated and/or exchanged into the washcoat.

As used herein, a catalyst composition comprises:
(a) a substrate; and
(b) a catalyst.

If a washcoat is present on the substrate, the catalyst composition may further comprise the washcoat on the substrate.

The substrate, the washcoat, and the impregnated or exchanged solution may be calcined to form the catalyst composition. In an embodiment, the washcoat and the impregnated or exchanged solution may be dried before calcining.

If the first catalyst is supported on a substrate, a first catalyst composition comprises:
a) a substrate; and
b) a first catalyst, wherein the first catalyst comprises:
approximately 0.2 to approximately 15 weight percent of at least one silver component selected from the group consisting of silver and silver compounds; and
at least one first inorganic oxide support, wherein the silver component is supported on the first inorganic oxide support.

If the second catalyst is supported on a substrate, a second catalyst composition comprises:
a) a substrate; and
b) a second catalyst comprising:
approximately 1 to approximately 30 weight percent of a modifier oxide selected from the group consisting of iron oxide, cerium oxide, copper oxide, manganese oxide, chromium oxide, a lanthanide oxide, an actinide oxide, molybdenum oxide, tin oxide, indium oxide, rhenium oxide, tantalum oxide, osmium oxide, barium oxide, calcium oxide, strontium oxide, potassium oxide, vanadium oxide, nickel oxide, tungsten oxide, and mixtures thereof; and
at least one second inorganic oxide support, wherein at least one of the second inorganic oxide supports is an acidic inorganic oxide support,
wherein the modifier oxide is supported on the second inorganic oxide support,
wherein the weight percent of the silver component is on the basis of silver metal relative to the weight of the first inorganic oxide support, and
wherein the weight percent of the modifier oxide is on the basis of the corresponding metal relative to the weight of the second inorganic oxide support.

In an alternative embodiment, either or both of the first and the second catalysts may be molded into a suitable shape such as a honeycomb, pellets, or beads. In an embodiment, either or both of the first and the second catalysts may be extruded into exudates.

In an embodiment, the first catalyst may be formed by milling or mulling the silver component, the first inorganic oxide support, and any other components of the first catalyst with water to form a paste. The paste may be extruded through a die to form extrudates. The extrudates may be dried and calcined, thereby forming the first catalyst.

Similarly, in an embodiment, the second catalyst may be formed by milling or mulling the modifier oxide or precursor of the modifier oxide, the second inorganic oxide support, and any other components of the second catalyst with water to form a paste. The paste may be extruded through a die to form extrudates. The extrudates may be dried and calcined, thereby forming the second catalyst.

Figure 1:
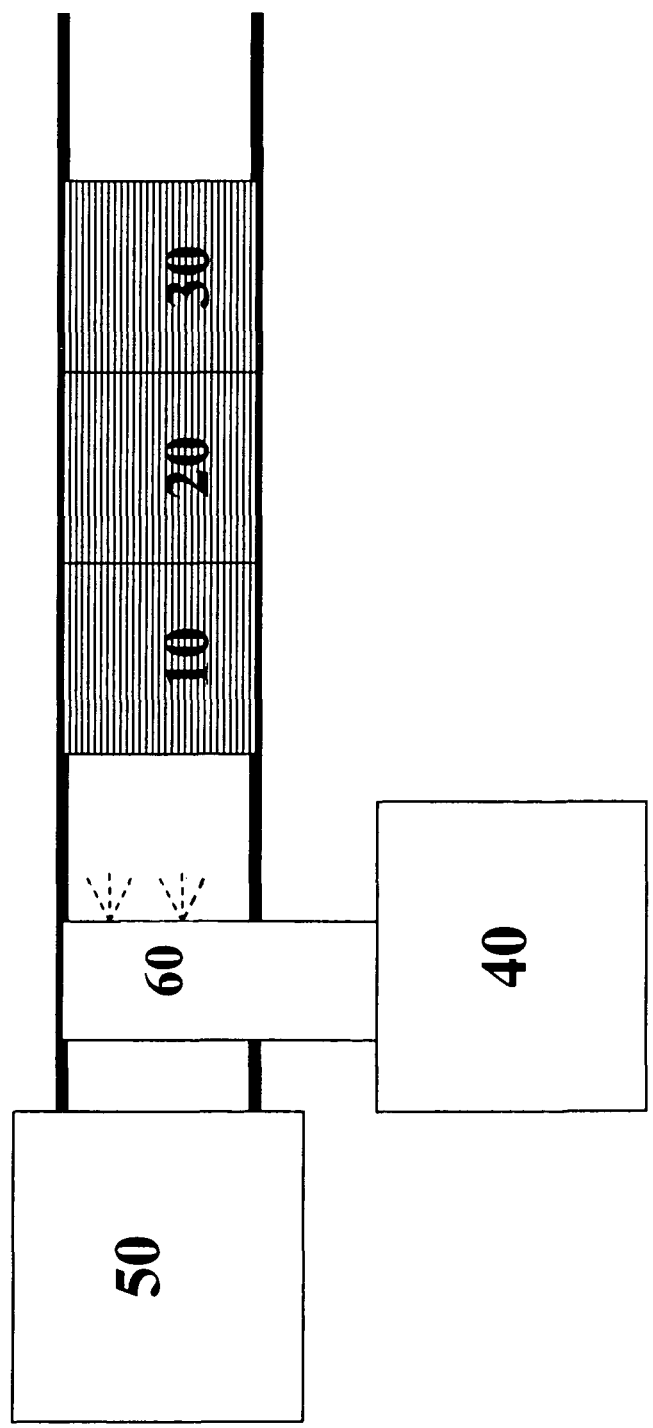
FIG. 1 is a schematic drawing of an exhaust gas treatment apparatus for the reduction of $NO_x$ using hydrocarbons or alcohols as reducing agents according to an embodiment of the present invention.

In an alternative embodiment, either or both of the first and the second catalysts may be pressed into pellets. Other manners of forming shaped catalysts are also suitable. FIG. 1 shows an exhaust gas treatment apparatus according to an embodiment of the invention. The apparatus includes a catalyst system, an exhaust gas source, a reservoir of reducing agent, and a means for introducing reducing agent into the exhaust gas.

The catalyst system includes a first catalyst 10 and a second catalyst 20. The catalyst system has an inlet side and an outlet side.

The first catalyst 10 is a silver selective catalytic reduction catalyst that contains a silver component supported on a first inorganic oxide support. In an embodiment, the first catalyst 10 is a silver/alumina catalyst. The second catalyst 20 is a modifier catalyst according to an embodiment of the present invention. A third catalyst 30 is an oxidation catalyst, for example, but not limited to, a $Pt/Al_2O_3$ catalyst. The third catalyst 30, the oxidation catalyst, is optional.

The first catalyst 10 and the second catalyst 20 are disposed in that order from the inlet side to the outlet side of the catalyst system.

The weight ratio of the first catalyst to the second catalyst is in a ratio of 1:5 to 5:1. If the ratio is greater than 1:5, there may be insufficient silver catalyst for the reaction between the nitrogen oxides and the reducing agent to proceed sufficiently.

If the weight ratio of the first catalyst to the second catalyst, the modifier catalyst, is greater than 5:1, there may be insufficient modifier catalyst to completely convert the nitrogen-containing intermediates that are generated over the first catalyst, the silver catalyst.

More preferably, the weight ratio of the first catalyst, the silver catalyst to the second catalyst, the modifier catalyst is in a weight ratio of 1:3 to 3:1 and most preferably approximately 1:1.

Reservoir 40 contains a reducing agent such as a hydrocarbon or an oxygen-containing organic compound. In an embodiment, the reducing agent may be ethanol.

Exhaust gas source 50 is a combustion device that generates exhaust gas. The exhaust gas contains $NO_x$.

In an embodiment, the reducing agent is injected into the exhaust stream through reducing agent injector 60. The reducing agent may be introduced into the exhaust gas in any suitable manner. Introducing the reducing agent into the exhaust gas through the reducing agent injector 60 is illustrative only and is not meant to be limiting. The reducing agent may be introduced into the exhaust gas by any suitable means. For example, an inert gas may be bubbled though a liquid that comprises reducing agent. The inert gas and entrained reducing agent may be introduced into the exhaust gas, thereby introducing the reducing agent into the exhaust gas. The liquid that comprises reducing agent may be liquid reducing agent, a solution of the reducing agent, or any other suitable liquid that comprises the reducing agent.

The reducing agent may also be introduced into the exhaust gas by injecting the reducing agent through the reducing agent injector 60. Other means of introducing the reducing agent into the exhaust gas will be apparent to one skilled in the art.

Method for Removing $NO_x$:

The exhaust gas normally does not contain sufficient reducing agent to reduce the $NO_x$ that is contained in the exhaust gas. A hydrocarbon or oxygen-containing organic compound reducing agent is normally introduced into the exhaust gas before the exhaust gas contacts the first catalyst 10, the silver catalyst. The exhaust gas and reducing agent contact the first catalyst 10 and then the second catalyst 20, the modifier catalyst, thereby reducing the nitrogen oxides in the exhaust gas. The exhaust gas and reducing agent are optionally contacted with the oxidation catalyst 30 after contacting the second catalyst 20, the modifier catalyst. The oxidation catalyst 30 oxidizes any remaining hydrocarbons, carbon monoxide, and nitrogen-containing organic intermediates in the exhaust gas.

The oxidation catalyst 30 is optional, because the second catalyst 20, the modifier catalyst, converts the nitrogen-containing intermediates to nitrogen and converts a significant amount of the hydrocarbons and carbon monoxide to carbon dioxide and water. If more complete conversion of the hydrocarbon and/or carbon monoxide is required, it may be preferable to use an oxidation catalyst 30 in the catalyst system. Because the modifier catalyst 20 may oxidize at least a portion of the hydrocarbon and/or the carbon monoxide, the presence of the modifier catalyst 20 may allow the use of a smaller amount of oxidation catalyst 30 than would otherwise be needed.

The reducing agent can be a hydrocarbon or an oxygen-containing organic compound such as an alcohol, an aldehyde, or a ketone. The reducing agent can also be mixtures of hydrocarbons, mixtures of oxygen-containing organic compounds, or mixtures of hydrocarbons and oxygen-containing organic compounds. Fuels containing hydrocarbons may also be used as the reducing agent. Fuels such as gasoline, kerosene, diesel, fuel oil, bunker C, and other fuels are suitable.

The oxygen-containing organic compounds may be alcohols, ketones, aldehydes, and the like. Ethanol and isopropanol are examples of suitable alcohols, though other alcohols or oxygen-containing organic compounds may be used.

In an embodiment, the reducing agent is ethanol.

The carbon/NO ratio of the reducing agent to NO is in the range of approximately 1 to approximately 1000, more preferably in the range of approximately 1 to approximately 200, and most preferably in the range of approximately 1 to approximately 10. Lower carbon/NO ratio are generally preferred in order to reduce operating costs, especially for large scale applications.

As shown in the examples below, it may be advantageous to utilize higher carbon/NO rations when the $NO_x$ levels in the feed gas are low. High carbon/$NO_x$ ratios may improve the $NO_x$ conversion when the $NO_x$ levels in the feed gas are low.

The space velocity of the exhaust gas passing through the first catalyst, the silver catalyst, is in the range of approximately 1,000 $hr^{-1}$ to approximately 100,000 $hr^{-1}$, more preferably in the range of approximately 1,000 $hr^{-1}$ to approximately 50,000 $hr^{-1}$, and most preferably in the range of 1,000 $hr^{-1}$ to approximately 30,000 $hr^{-1}$.

The space velocity of the exhaust gas passing through the second catalyst, the modifier catalyst according to embodiments of the present invention, is in the range of approximately 1,000 $hr^{-1}$ to approximately 100,000 $hr^{-1}$, more preferably in the range of approximately 1,000 $hr^{-1}$ to approximately 50,000 $hr^{-1}$, and most preferably in the range of 1,000 $hr^{-1}$ to approximately 30,000 $hr^{-1}$.

The space velocity of the exhaust gas passing through the third catalyst, the oxidation catalyst, is in the range of approximately 1,000 $hr^{-1}$ to approximately 100,000 $hr^{-1}$, more preferably in the range of approximately 1,000 $hr^{-1}$ to approximately 50,000 $hr^{-1}$, and most preferably in the range of 1,000 $hr^{-1}$ to approximately 30,000 $hr^{-1}$.

The exhaust gas is contacted with the first catalyst 10 and the second catalyst 20 at a temperature of approximately 150° C. to approximately 700° C., more preferably at a temperature of approximately 300° C. to approximately 600° C., and most preferably at a temperature of approximately 300° C. to approximately 500° C.

If the temperature of the exhaust gas is lower than approximately 150° C., the reduction of the nitrogen oxides may be low. At temperatures greater than approximately 650° C., the reducing agent may be oxidized. If the reducing agent is oxidized, there may be insufficient reducing agent in the exhaust gas to reduce the nitrogen oxides.

The second catalyst 20, the modifier catalyst, may also be used alone to convert nitrogen-containing intermediates into nitrogen. The reaction conditions for converting the nitrogen-containing intermediates into nitrogen may be similar to the reaction conditions that are used for the second catalyst 20 when both a first catalyst 10 and a second catalyst 20 are present. The second catalyst 20, the modifier catalyst, may also be used to convert carbon monoxide or hydrocarbons into carbon dioxide.

The catalysts and the methods of the present invention have improved ability to remove nitrogen oxides, hydrocarbons, and carbon monoxide from the exhaust gases of internal combustion engines and from industrial waste gases. The catalysts and methods may have application to any engine that operates with an excess of oxygen, for example diesel engines, lean burn gasoline engines, or engines that are fueled with compressed natural gas. The catalysts and methods can also be used with gas turbines, power plants, coal fired power plants, and industrial boilers or furnaces.

The following examples are intended to illustrate, but not to limit, the scope of the invention. It is to be understood that other procedures known to those skilled in the art may alternatively be used.

Example 1

$NO_x$ Conversion Over a Silver on Alumina Catalyst with and Without an Oxidation Catalyst as a Function of Temperature A silver/alumina monolith catalyst was prepared as follows. By mixing water, silver nitrate, and alumina, a slurry was formed. This slurry was ball milled and coated on a 400 cells per square inch monolith substrate and calcined at 600° C. to produce a 1.2% silver on alumina monolith substrate coated catalyst 10.

Figure 2:
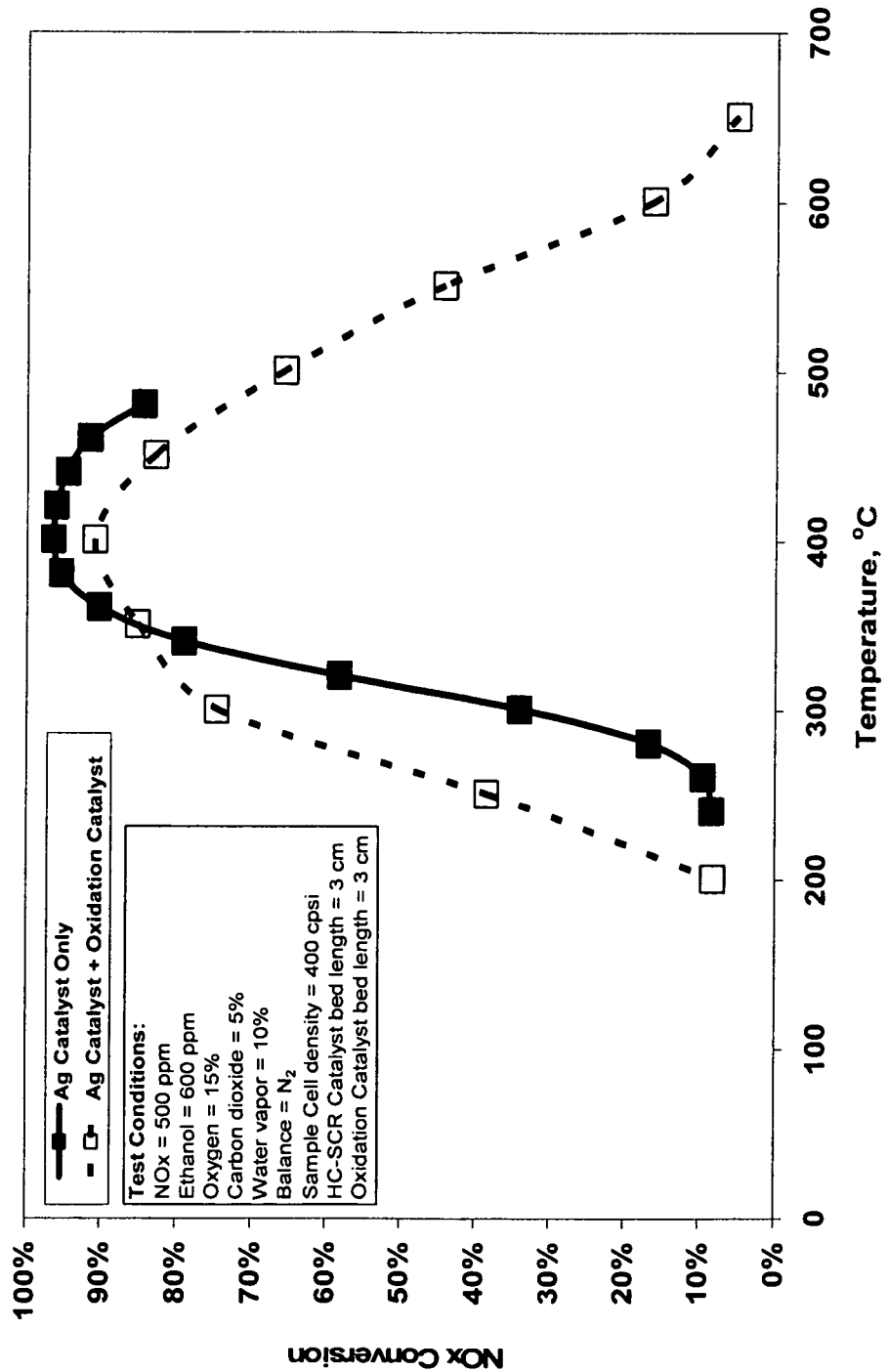
FIG. 2 is a graph of $NO_x$ conversion versus temperature in degrees Centigrade for a silver/$Al_2O_3$ catalyst with and without a platinum on alumina oxidation catalyst with an exhaust gas that contains approximately 500 ppm $NO_x$ and approximately 600 ppm ethanol.

FIG. 2 shows a graph of the $NO_x$ conversion versus temperature in degrees Centigrade for the 1.2% $Ag/Al_2O_3$ catalyst 10 with and without a platinum on alumina oxidation catalyst 30 placed in the feed stream after the silver catalyst, as shown in FIG. 1. The test was conducted with a feedstream that contained 500 ppm $NO_x$ and 600 ppm ethanol. The feed gas also contained 15% oxygen, 5% carbon dioxide, 10% water vapor, with the balance being nitrogen. The flow rate of the feed stream was maintained at one standard liter per minute, which corresponds to a space velocity of 20,000 $hr^{-1}$. Table 1 shows $NO_x$ conversion and outlet CO concentration at 400° C. While 95% of $NO_x$ was reduced over the silver catalyst at 400° C., a significant amount of carbon monoxide was formed on this catalyst. The carbon monoxide formed by the silver catalyst could be removed by using a platinum on alumina oxidation catalyst. Example 1B of Table 1 also shows that the presence of platinum on alumina oxidation catalyst after the silver on alumina catalyst removed essentially all the carbon monoxide formed by the silver on alumina catalyst.

TABLE 1

$NO_x$ Conversions and Outlet CO Concentrations in ppm at 400° C.

| Example No. | Catalyst System | $NO_x$ Conversion | Outlet CO, ppm |
|---|---|---|---|
| 1A | 1.2% $Ag/Al_2O_3$ | 95% | 140 |
| 1B | 1.2% $Ag/Al_2O_3$ + Pt/$Al_2O_3$ | 90% | <1 |

As shown in Table 1 and in FIG. 2, the $NO_x$ conversions for the silver catalyst with and without the oxidation catalyst were similar in the temperature range of approximately 300-600° C., when the feed gas contained 500 ppm $NO_x$. If the exhaust gas had contained large amounts of a nitrogen-containing intermediate after passing over the silver catalyst, the nitrogen-containing intermediate would have been oxidized by the oxidation catalyst, lowering the apparent $NO_x$ conversion. The fact that the $NO_x$ conversion did not significantly change with the addition of the oxidation catalyst may be consistent with having only small amounts of nitrogen-containing intermediates in the exhaust gas when the exhaust gas contacts the oxidation catalyst. Therefore the result in FIG. 2 suggests that, when the $NO_x$ concentration is high, for example, approximately 500 ppm, the silver/alumina catalyst alone may be able to convert the $NO_x$ to nitrogen.

Example 2

$NO_x$ Conversion Over Silver Catalysts with and without an Oxidation Catalyst with a Feedstream Containing 25 ppm $NO_x$ Silver/alumina monolith catalysts were prepared with two different preparation methods. Catalyst 1 was prepared with a one step washcoat method as described in Example 1.

Catalyst 2 was prepared with a two step process by washcoating the substrate with alumina and then impregnating the alumina washcoat with an aqueous solution of silver nitrate. Catalyst 2 was prepared as follows. An alumina slurry was formed by mixing alumina and water. The slurry was ball milled, coated on a 400 cells per square inch monolith substrate, and dried. Silver nitrate was impregnated on the alumina coated monolith and calcined at 600° C. to produce a 1.2% silver on alumina catalyst.

The metal loadings on the calcined monolith catalysts are shown in Table 2, where the percent loadings are calculated on a metal basis relative to the weight of the alumina support.

TABLE 2

Catalyst Compositions for Example 2

| Catalyst | Composition | Preparation procedure |
|---|---|---|
| 1 | 1.2 wt % Ag/$Al_2O_3$ | Washcoat |
| 2 | 1.2 wt % Ag/$Al_2O_3$ | Washcoat followed by impregnation |
| 3 | Pt/$Al_2O_3$ | |

Catalyst 3 is a Pt/$Al_2O_3$ oxidation catalyst prepared by impregnation of a washcoated substrate.

A test gas having the composition shown in Table 3 was contacted with the catalysts at a rate of 1 liter per minute, which corresponds to a space velocity of 8,000 $hr^{-1}$. The tests were carried out in a temperature range of 300-500° C.

TABLE 3

Test Gas for Example 2

| Component | Concentration |
|---|---|
| $NO_x$ | 25 ppm |
| Ethanol | 250 ppm |
| $O_2$ | 12% |
| $CO_2$ | 4% |
| $H_2O$ | 10% |
| $N_2$ | Balance |

Figure 3:
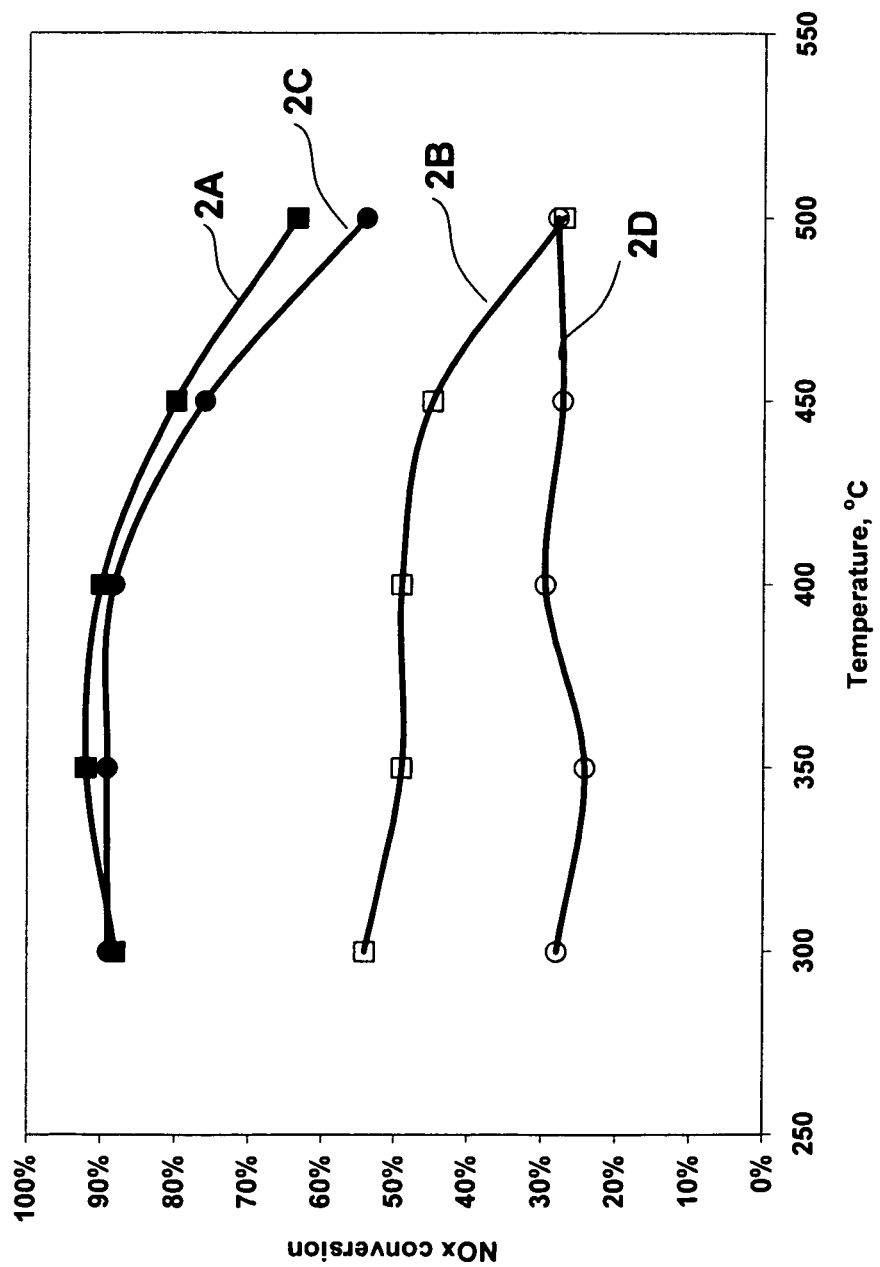

Catalysts 1 and 2 were tested for $NO_x$ conversion with and without the oxidation catalyst, Catalyst 3. The test results as a function of temperature are shown in FIG. 3. The $NO_x$ conversions and outlet CO concentration in ppm at 400° C. are summarized in Table 4.

TABLE 4

$NO_x$ Conversions at 400° C. For Silver SCR Catalyst Systems With and Without an Oxidation Catalyst

| Catalyst | Oxidation Catalyst? | $NO_x$ Conversion at 400° C. | CO ppm at 400° C. | Example Number (FIG. 3) |
|---|---|---|---|---|
| 1.2% Ag/$Al_2O_3$ (Washcoated catalyst) | No | 90% | 82 | 2A |
| 1.2% Ag/$Al_2O_3$ (Washcoated catalyst) | Yes | 49% | <2 | 2B |
| 1.2% Ag/$Al_2O_3$ (Impregnated catalyst) | No | 88% | 108 | 2C |
| 1.2% Ag/$Al_2O_3$ (Impregnated catalyst) | Yes | 30% | <2 | 2D |

In all cases, with the feedgas of Table 3 that contained 25 ppm $NO_x$, the presence of the oxidation catalyst downstream of the silver-based catalyst led to lower $NO_x$ conversion compared to the corresponding system with the silver-containing catalyst alone, as shown in FIG. 3 and Table 4. It is believed that the oxidation catalyst may have oxidized organic nitrogen-containing intermediates that are produced over the silver-based catalyst. Nitrogen is produced from the organic nitrogen-containing intermediates through reactions 2 and 3. If the organic nitrogen-containing intermediates are oxidized, the $No_x$ conversion would decrease, consistent with the results shown in FIG. 3 and Table 4.

The $NO_x$ conversion was lower when an oxidation catalyst was present, regardless of how the silver catalyst was prepared.

Example 3

$NO_x$ Conversion and CO Production Over a Silver/Alumina Catalyst with a Feedstream Containing 9 PPM $NO_x$ with Propane as a Reductant with and without an Oxidation Catalyst FIG. 4 shows a series of graphs of $NO_x$ conversion (left hand axis) and outlet CO (right hand scale) versus temperature for a silver/alumina catalyst with 6000 ppm propane as a reductant with a feedgas that contained 9 ppm $NO_x$. The feed gas also contained 12% oxygen, 4% carbon dioxide, and 10% water vapor, with the balance being nitrogen. The test was conducted at a space velocity of 8000 $hr^{-1}$.

CO was produced as a byproduct of $NO_x$ conversion when propane was used as a reductant. Oxidizing the CO with an oxidation catalyst removed the CO. However, the apparent $NO_x$ conversion declined significantly in the presence of an oxidation catalyst, as shown in FIG. 4. It is believed that the oxidation catalyst may have oxidized the nitrogen-containing intermediates formed via reaction 1, thereby lowering the apparent $NO_x$ conversion.

Example 4

$NO_x$ Conversion Versus Temperature for a Silver/Alumina Catalyst with a Feedgas Containing 9 ppm $NO_x$ with Ethanol as a Reductant with and without an Iron Modifier Catalyst A modifier catalyst containing iron was prepared as follows. A slurry containing mixed washcoat was formed by mixing water and approximately 40% weight % alumina, 50 weight % mixed zeolites, and 10 weight % $Ce_{0.24}Zr_{0.66}La_{0.04}Y_{0.06}O_2$. The mixed zeolites were H-ZSM-5 and H-beta in a 50/50 weight ratio. This mixed washcoat slurry was ball milled, coated on a 400 cells per square inch monolith, and dried.

Sufficient iron nitrate to form a modifier catalyst containing 10% iron on the mixed washcoat was dissolved in an amount of distilled water equal to the water pick up of the washcoated substrate. The iron nitrate solution was impregnated on the washcoated substrate and dried. The dried substrate was calcined at 550° C. to produce the iron modifier catalyst.

FIG. 5 shows a series of plots of $NO_x$ conversion versus temperature with an exhaust gas that contained 9 ppm $NO_x$ and 2250 ppm ethanol for various systems that contained a silver/alumina catalyst. The other feed stream components were the same as used for Example 2.

Plots are shown for the silver/alumina catalyst alone (Plot 4A), the silver/alumina catalyst with an iron modifier catalyst (Plot 4B), the silver/alumina catalyst with an iron modifier catalyst and an oxidation catalyst (Plot 4C), an iron modifier catalyst alone (Plot 4D), and the silver/alumina catalyst with an oxidation catalyst (Plot 4E). In FIG. 5, the total catalyst volume in Plots 4A and 4B is the same. In FIG. 5, the volume ratio of the silver catalyst to the iron modifier catalyst in Plots 4B and 4C was approximately 1:1. Table 5 summarizes the $NO_x$ conversions for the various catalyst systems at 400° C.

TABLE 5

NO$_x$ Conversions at 400° C. for Various Catalyst Systems

| Plot No. | Catalyst System | % NO$_x$ Conversion |
|---|---|---|
| 4A | Ag/Al$_2$O$_3$ | 84% |
| 4B | Ag/Al$_2$O$_3$ + Iron/Zeolite Modifier Catalyst | 75% |
| 4C | Ag/Al$_2$O$_3$ + Iron/Zeolite Modifier Catalyst + Oxidation Catalyst | 67% |
| 4D | Iron/Zeolite Modifier Catalyst Alone | 15% |
| 4E | Ag/Al$_2$O$_3$ + Oxidation Catalyst | 9% |

The NO$_x$ conversion at 400° C. with the feedstream containing 9 ppm of NO$_x$ and 2250 ppm ethanol declined from 84% with the silver catalyst alone (Plot 4A) to 9% with the system that contained a combination of the silver catalyst and the oxidation catalyst (Plot 4E). Without wishing to be restricted to a theory, it is believed that the oxidation catalyst may have oxidized nitrogen-containing intermediates that were generated over the silver/alumina catalyst, thereby lowering the apparent NO$_x$ conversion.

The NO$_x$ conversion at 400° C. with the combination of the silver/alumina catalyst and the iron modifier catalyst (Plot 4B) was 75%. The NO$_x$ conversion was only slightly lower than the 84% NO$_x$ conversion for the silver catalyst alone. It is believed that the modifier catalyst may have converted nitrogen-containing intermediates that were generated over the silver/alumina catalyst into nitrogen. The conversion into nitrogen of nitrogen-containing intermediates that were generated over the silver catalyst would maintain the high NO$_x$ conversion that was achieved over the silver catalyst, The NO$_x$ conversion declined only slightly, to approximately 67%, when an oxidation catalyst was placed after the Ag/Al$_2$O$_3$ catalyst and the modifier catalyst (Plot 4C). It is believed that the nitrogen-containing intermediates may have been converted over the iron modifier catalyst, leaving only a small amount of nitrogen-containing intermediates to be oxidized by the oxidation catalyst. Oxidation of a significant quantity of nitrogen-containing intermediate would have lowered the NO$_x$ conversion.

The NO$_x$ conversion with the combination of the Ag/Al$_2$O$_3$ catalyst and the oxidation catalyst was only 9% (Plot 4E). In the system of 4E, there was no modifier catalyst that could convert nitrogen-containing intermediates to nitrogen. Most of the nitrogen-containing intermediates that were produced over the silver/alumina catalyst would have been oxidized by the oxidation catalyst, thereby lowering the NO$_x$ conversion.

Plot 4D shows a plot of NO$_x$ conversion versus temperature for an iron modifier catalyst with no Ag/Al$_2$O$_3$ catalyst. The NO$_x$ conversion with the iron modifier catalyst of Plot 4D was only 18%. The modifier catalyst alone had poor activity for NO$_x$ conversion. The NO$_x$ conversion was far greater when a silver/alumina catalyst was placed before the iron modifier catalyst, as shown in Plot 4B.

Example 5

NO$_x$ Conversions with and without a Cerium Modifier Catalyst with a Feedstream Containing 25 Ppm NO$_x$ Cerium-based Modifier Catalyst 1 was prepared using a single step procedure described as follows. Cerium-based mixed washcoat slurry was formed by mixing a sufficient amount of cerium nitrate, water and approximately 40% weight % alumina, 50 weight % mixed zeolites, and 10 weight % Ce$_{0.24}$Zr0.66La$_{0.04}$Y$_{0.06}$O$_2$. The mixed zeolites were H-ZSM-5 and H-beta in a 50/50 weight ratio. This slurry was ball milled, coated on a 400 cells per square inch monolith, and dried. The dried monolith was calcined at 550° C. to produce a 10 wt % cerium on mixed washcoated monolith substrate.

Cerium-based Modifier Catalyst 2 was prepared using a two step procedure described as follows: a mixed washcoat slurry was formed by mixing water and approximately 40% weight % alumina, 50 weight % mixed zeolites, and 10 weight % Ce$_{0.24}$Zr$_{0.66}$La$_{0.04}$Y$_{0.06}$O$_2$. The mixed zeolites were H-ZSM-5 and H-beta in a 50/50 weight ratio. This slurry was ball milled, coated on a 400 cells per square inch monolith, and dried. The dried monolith was impregnated with a sufficient amount of cerium nitrate so that the resulting catalyst formed a 10 wt % cerium on mixed washcoated monolith substrate upon calcination at 550° C.

NO$_x$ conversion tests were performed with and without Cerium-based Modifier Catalysts 1 and 2 under the same conditions as in Example 2. Graphs of NO$_x$ conversion versus temperature for the silver catalyst with and without the modifier catalysts are shown in FIG. 6. The NO$_x$ conversions at 400° C. for three catalyst systems are shown in Table 6.

TABLE 6

NO$_x$ Conversions at 400° C. for Silver SCR Catalyst Systems With and Without a Modifier Catalyst

| Example No. | Catalyst System | NO$_x$ Conversion at 400° C. |
|---|---|---|
| 5A | Catalyst 1 (1.2% Ag/Al$_2$O$_3$) + Pt/Al$_2$O$_3$ Oxidation Catalyst | 49% |
| 5B | Catalyst 1 (1.2% Ag/Al$_2$O$_3$) + Modifier Catalyst 1 + Pt/Al$_2$O$_3$ Oxidation Catalyst | 91% |
| 5C | Catalyst 1 (1.2% Ag/Al$_2$O$_3$) + Modifier Catalyst 2 + Pt/Al$_2$O$_3$ Oxidation Catalyst | 90% |

Tests for Example 5A were conducted at a space velocity of 8000 hr$^{-1}$, based on the volume of Catalyst 1, the 1.2% Ag/Al$_2$O$_3$ catalyst. The tests for Examples 5B and 5C were conducted at a total space velocity of 8,000 hr$^{-1}$, based on the volume of the silver catalyst and the modifier catalyst. The volume ratio of silver catalyst to the modifier catalyst in Examples 5B and 5C was approximately 1:1.

The catalyst systems of Examples 5B and 5C differed in that the catalyst system of Example 5B contained Modifier Catalyst 1, while the catalyst system of Example 5C contained Modifier Catalyst 2.

The NO$_x$ conversion at 400° C. with the modifier catalysts of Examples 5B and 5C were 91%, and 90%, respectively, compared to 49% for Example 5A, which did not contain a modifier catalyst. Placing a cerium modifier catalyst between the silver/alumina SCR catalyst and the oxidation catalyst increased the NO$_x$ conversion by about 40%. The NO$_x$ conversions did not change significantly with the two different preparation methods of the modifier catalyst.

FIG. 6 shows graphs of NO$_x$ conversion versus temperature for Examples 5A, 5B, and 5C. The NO$_x$ conversions for Examples 5B and 5C with the modifier catalyst placed between the silver catalyst and the Pt/Al$_2$O$_3$ oxidation catalyst were between 50 and 95%, compared to approximately 25-50% for Example 5A, the catalyst system with no modifier catalyst. The presence of the modifier catalyst in Example 5B and Example 5C improved the NO$_x$ conversion compared to the catalyst system of Example 5A with no modifier catalyst over the entire temperature range of 300-500° C.

Although not wishing to be limited by a theory, it is believed that the modifier catalysts of Examples 5B and 5C may have converted nitrogen-containing intermediates into nitrogen, thereby providing higher $NO_x$ conversion than the catalyst system of Example 5A, which did not contain a modifier catalyst. The nitrogen-containing intermediates from the silver catalyst from Example 5A without a modifier catalyst would have been oxidized by the oxidation catalyst before they could be converted into nitrogen. Oxidation of the nitrogen-containing intermediates would decrease the $NO_x$ conversion.

Example 6

CO Conversions with a Silver Catalyst and a Modifier Catalyst with and without a Downstream Pt/Al$_2$O$_3$ Oxidation Catalyst Tests of $NO_x$ and CO conversion were performed at 400° C. for the three catalyst systems shown in Table 7 using the feed gas of Table 3. The first catalyst in all three systems was a 1.2% Ag/Al$_2$O$_3$ catalyst. In Example 6B, the silver catalyst was followed by Cerium-based Modifier Catalyst 1 prepared as described in Example 5. In Example 6C, a Pt/Al$_2$O$_3$ catalyst was placed after the Cerium-based Modifier Catalyst 1.

TABLE 7

$NO_x$ and CO Conversions Using a Silver and a Modifier Catalyst With and Without a Downstream Pt/Al$_2$O$_3$ Oxidation Catalyst

| Example No. | Catalyst | $NO_x$ Conversion at 400° C. | CO, ppm at 400° C. |
|---|---|---|---|
| 6A | 1.2% Ag/Al$_2$O$_3$ | 90% | 86 |
| 6B | 1.2% Ag/Al$_2$O$_3$ + Modifier Catalyst 1 | 94% | 27 |
| 6C | 1.2% Ag/Al$_2$O$_3$ + Modifier Catalyst 1 + Pt/Al$_2$O$_3$ | 92% | <2 |

The effluent gas for Example 6A with the silver catalyst alone contained 86 ppm CO. Adding Modifier Catalyst 1 in Example 6B lowered the amount of CO in the effluent gas to 27 ppm. The modifier catalyst oxidized about 69% of the CO in the gas stream by the silver/alumina catalyst.

A Pt/Al$_2$O$_3$ catalyst was placed after Modifier Catalyst 1 in Example 6C. The effluent gas contained less than 2 ppm CO. The combination of Modifier Catalyst 1 and the platinum/alumina oxidation catalyst removed essentially all of the CO.

The modifier catalyst has a significant ability to oxidize CO, as shown by Example 6B. The oxidation catalyst after the modifier catalyst removed any remaining CO in the effluent gas stream.

Example 7

$NO_x$ Conversions with a Silver/Alumina Catalyst and Various Modifier Catalysts with Isopropyl Alcohol as the Reducing Agent Modifier catalysts with various metals were prepared according to the procedure described in Example 4. The compositions and preparation methods for the modifier catalyst are listed in Table 8.

TABLE 8

Modifier Catalyst Compositions for Example 7

| Example No. | Catalyst Name | Catalyst Composition | Preparation Method |
|---|---|---|---|
| 7A | Ce-Modifier | 10% Ce on Mixed Washcoat | Washcoat Followed by Cerium Impregnation |
| 7B | Fe Modifier | 10% Fe on Mixed Washcoat | Washcoat Followed by Impregnation |
| 7C | Ce—Cu Modifier | 10% Ce and 5% Cu on Mixed Washcoat | Washcoat Followed by Co-impregnation |
| 7D | Cu Modifier | 5% Cu on Mixed Washcoat | Washcoat Followed by Impregnation |

The modifier catalysts of Table 8 were tested as follows. A 1.2% silver/alumina catalyst was placed in the feedgas stream before the modifier catalyst. A platinum on alumina catalyst was placed after the modifier catalyst. Isopropanol was used as the reducing agent. The tests were conducted with the feed gas described in Table 9.

TABLE 9

Feed Gas for Example 7

| Component | Concentration |
|---|---|
| $NO_x$ | 25 ppm |
| Isopropyl Alcohol | 300 ppm |
| $O_2$ | 12% |
| $CO_2$ | 4% |
| $H_2O$ | 10% |
| $N_2$ | Balance |

FIG. 7 shows a series of graphs of $NO_x$ conversion as a function of temperature for the various modifiers that were tested. The total space velocity was based on the silver catalyst plus the modifier catalyst. The silver catalyst to modifier catalyst volumetric ratio was 1:1. Table 10 shows the $NO_x$ conversions and outlet CO concentrations at 450° C. for various catalyst systems with the modifier catalyst systems shown in Table 8.

TABLE 10

$NO_x$ Conversions and Outlet CO Concentrations for Catalyst Systems of Example 7

| Example No. | Catalyst System | $NO_x$ Conversion | Outlet CO Concentration, ppm |
|---|---|---|---|
| 7A | 1.2% Ag/Al$_2$O$_3$ + Ce Modifier + Pt/Al$_2$O$_3$ | 82% | <2 |
| 7B | 1.2% Ag/Al$_2$O$_3$ + Fe Modifier + Pt/Al$_2$O$_3$ | 92% | <2 |
| 7C | 1.2% Ag/Al$_2$O$_3$ + Cu—Ce Modifier + Pt/Al$_2$O$_3$ | 78.5% | <2 |
| 7D | 1.2% Ag/Al$_2$O$_3$ + Cu Modifier + Pt/Al$_2$O$_3$ | 60% | <2 |

Example 8

$NO_x$ Conversion with a Feedgas Containing 500 ppm $NO_x$ Using a Silver on Alumina Catalyst and Modifier Catalysts A feed gas containing 500 ppm of $NO_x$, 600 ppm of ethanol, 6% oxygen, 5% carbon dioxide and 10% water vapor was used in Example 8. The tests were performed at a total space velocity of 20,000 hr$^{-1}$ in the temperature range of 300 to 500° C. The total space velocity was based on the silver catalyst alone when no modifier was used and on the silver catalyst plus the modifier catalyst when a modifier catalyst was used. The ratio to silver catalyst to the modifier catalyst was approximately 1:1 in the tests that contained the modifier catalyst.

FIG. 8 shows a series of graphs for the tests performed in Example 8. The catalyst systems tested were: a silver on alumina catalyst, a silver on alumina catalyst with a platinum oxidation catalyst; a silver on alumina catalyst with Cerium-Based Modifier Catalyst 1 and a platinum oxidation catalyst; a silver on alumina catalyst followed by a Cu—Ce modifier catalyst prepared as described in Example 7 and a platinum oxidation catalyst; and a silver on alumina catalyst with a Cu—Ce modifier catalyst. The graph illustrates that the presence of a modifier catalyst enhances NO$_x$ conversion even when a high inlet NO$_x$ concentrations of approximately 500 ppm are used.

Example 9

Long Term Activity Test of NO$_x$ Conversion with a Feedstream Containing 1 ppm SO$_2$ and 25 ppm NO$_x$ A long term activity test was performed to determine the stability of a catalyst system containing a 1.2% Ag/Al$_2$O$_3$ catalyst, Cerium-based Modifier Catalyst 1, prepared as described in Example 5, and a downstream Pt/Al$_2$O$_3$ oxidation catalyst.

The test was conducted at 400° C. with the gas stream shown in Table 3 except that the ethanol concentration was changed during the test, and sulfur dioxide was introduced after 550 hours on stream. The entire test was conducted at a total space velocity of 8000 hr$^{-1}$, based on the silver catalyst plus Modifier Catalyst 1. The silver catalyst to modifier catalyst volumetric ratio was 1:1. A graph of NO$_x$ conversion versus time is shown in FIG. 9.

The test was started with an ethanol/NO$_x$ ratio of 6. The EtOH/NO$_x$ ratio was then lowered to 5 and then 4. After approximately 100 hours of operation, the NO$_x$ conversion stabilized at 98-99% with an ethanol/NO$_x$ ratio of 4. The NO$_x$ conversion was stable for the next 300 hours, at which point the test was stopped. The catalyst system was then exposed to an air atmosphere for a period of approximately 100 hours. The NO$_x$ conversion decreased to about 90% after the test was restarted, compared to 98-99% before the test was halted. However, the NO$_x$ conversion soon stabilized at approximately 98-99%. There may be an induction period before the NO$_x$ conversion of the catalyst system stabilizes.

At approximately 550 hours of operation, approximately 1 ppm of sulfur dioxide was introduced into the feedstream. The NO$_x$ conversion decreased from 98-99% to approximately 80%. At approximately 1100 hours, the test was stopped, and the silver catalyst was replaced with a fresh silver catalyst. As soon as the test was restarted under the same conditions as previously with the exception of the fresh silver catalyst, the NO$_x$ conversion increased to 98%, indicating that the drop in NO$_x$ conversion activity was due to the poisoning effect of sulfur dioxide on the silver catalyst. The modifier catalyst was not deactivated by the presence of sulfur dioxide in the feed stream.

CONCLUSIONS FROM EXAMPLES

An exhaust gas that contained 500 ppm NO$_x$ was used in Example 1 and 8. An exhaust gas that contained 25 ppm NO$_x$ was used in Examples 2, 5, 6, 7, and 9. An exhaust gas that contained 9 ppm NO$_x$ was used in Examples 3 and 4. A wide range of NO$_x$ concentrations were investigated. The behavior of the selective catalytic reduction was significantly different for the high NO$_x$ system of Example 1 than for the low NO$_x$ system of Examples 2 and 3.

First, the presence of an oxidation catalyst after the silver/alumina catalyst did not decrease the NO$_x$ conversion when the NO$_x$ concentration was high, for example, approximately 500 ppm, as described in Example 1.

Second, high ratios of reducing agent NO$_x$ were needed to obtain high NO$_x$ conversions when the exhaust gas contained low NO$_x$ levels, for example, the 9 ppm of Examples 3 and 4. In contrast, as shown in Example 1, over 90% of the NO$_x$ could be reduced with a reducing agent/NO$_x$ ratio of 1.4:1 when the exhaust gas contained 500 ppm of NO$_x$.

Third, a variety of reducing agents could be used, for example: ethanol, as shown in Examples 1 and 2, 4-6, 8 and 9; propane, as shown in Example 3; or isopropyl alcohol, as shown in Example 7.

Fourth, when the exhaust gas had low NO$_x$ concentrations (for example, 25 ppm), placing an oxidation catalyst after the silver/alumina catalyst resulted in a significant decrease of NO$_x$ conversion, irrespective of the reducing agent, as shown in Example 2.

Fifth, high NO$_x$ conversions to nitrogen with exhaust streams that contain low and high NO$_x$ levels could be obtained with a combination of an SCR catalyst followed by a modifier catalyst, as described in Examples 4-9. NO$_x$ conversions especially for exhaust streams that contained low levels of NO$_x$ did not decline even when an oxidation catalyst was placed after the modifier catalyst. The modifier catalyst was also able to oxidize significant quantities of CO in addition to improving the selective conversion of NO$_x$ to nitrogen.

Sixth, the modifier catalyst alone does not have good NO$_x$ conversion activity. A combination of a silver catalyst followed by the modifier catalyst may result in high NO$_x$ conversions. The combination, although not limited to, may be especially advantageous when the exhaust gas contains low NO$_x$ levels.

Seventh, the combination of silver catalyst and a modifier catalyst results in a catalyst system that is stable for several hours of operation, as described in Example 9. The modifier catalyst is also sulfur tolerant, as also described in Example 9.

The present invention may be embodied in other specific forms without departing from its essential characteristics. The described embodiment is to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

What is claimed is:

1. A catalyst system for removing nitrogen oxides from an exhaust gas by reduction with a reducing agent selected from the group consisting of hydrocarbons and oxygen-containing organic compounds, wherein said exhaust gas contains nitrogen oxides and oxygen in an amount larger than a stoichiometric amount relative to unburned components in said exhaust gas, said catalyst system having an inlet side and an outlet side, said catalyst system comprising:
    a first catalyst comprising:
        approximately 0.2 to approximately 15 weight percent of at least one silver component selected from the group consisting of silver and silver compounds; and at least one first inorganic oxide support, wherein the silver component is supported on the first inorganic oxide support; and a second catalyst comprising:

approximately 1 to approximately 30 weight percent of a modifier oxide comprising cerium oxide, copper oxide and manganese oxide, wherein the catalyst system does not comprise tungsten oxide or vanadium oxide; and at least one second inorganic oxide support comprising at least one zeolite, wherein at least one of the second inorganic oxide supports is an acidic inorganic oxide support, wherein the modifier oxide is supported on the second inorganic oxide support, wherein the weight percent of the silver component is on the basis of silver metal relative to the weight of the first inorganic oxide support, and wherein the weight percent of the modifier oxide is on the basis of the corresponding metal relative to the weight of the second inorganic oxide support said first catalyst and said second catalyst being disposed in that order from the inlet side to the outlet side of said catalyst system.

2. The catalyst system of claim 1, wherein at least a portion of the at least one zeolite is at least partially exchanged with at least one element selected from the group consisting of a Group 1A element, a Group 1B element, a Group IIA element, A Group IIB element, a Group IIIB element, a rare earth, and mixtures thereof.

3. The catalyst system of claim 1, wherein at least a portion of the at least one zeolite is in a form selected from the group consisting of the ammonium form and the protonic form.

4. The catalyst system of claim 1, wherein the at least one zeolite is selected from the group consisting of ZSM-5 and beta-zeolite and mixtures of these.

5. The catalyst system of claim 1, wherein at least one of the first catalyst and the second catalyst is supported on a substrate.

6. The catalyst system of claim 1, wherein at least one of the first catalyst and the second catalyst is formed into a shape.

7. The catalyst system of claim 6, wherein at least one of the first catalyst and the second catalyst is an extruded catalyst.

8. The catalyst system of claim 1, wherein said second catalyst further comprises an oxygen storage material.

9. The catalyst system of claim 8, wherein said oxygen storage material is a cerium oxide-based material.

10. The catalyst system of claim 1, wherein said reducing agent comprises ethanol.

11. The catalyst system of claim 1, wherein the modifier oxide is selected from the group consisting of iron oxide, cerium oxide, or mixtures of cerium and copper oxide.

12. The catalyst system of claim 11, wherein the modifier oxide comprises cerium oxide or a combination of copper oxide and cerium oxide.

13. A catalyst system of claim 1, wherein, at a given ratio of reducing agent to the nitrogen oxides, an activity of said catalyst system improves over time.

14. A catalyst system of claim 1, wherein an amount of said reducing agent that is required to reduce said nitrogen oxides decreases over time.

15. A method for removing nitrogen oxides from an exhaust gas by reduction with a reducing agent selected from the group consisting of hydrocarbons and oxygen-containing organic compounds, wherein said exhaust gas contains nitrogen oxides and oxygen in an amount larger than a stoichiometric amount relative to unburned components in said exhaust gas, said method comprising:

disposing a catalyst system having an inlet side and an outlet side in a flow path of said exhaust gas containing from 1 to 1000 ppm of $NO_x$;

introducing into said exhaust gas at least one reducing agent selected from the group consisting of hydrocarbons and oxygen-containing organic compounds on the inlet side of said catalyst system;

bringing the resulting exhaust gas containing the reducing agent into contact with said catalyst system at a temperature of approximately 150° C. to approximately 650° C., thereby reacting said nitrogen oxides with said reducing agent to remove said nitrogen oxides by reduction;

said catalyst system comprising:

a first catalyst comprising:

approximately 0.2 to approximately 15 weight percent of at least one silver component selected from the group consisting of silver and silver compounds; and at least one first inorganic oxide support, wherein the silver component is supported on the first inorganic oxide support; and a second catalyst comprising:

approximately 1 to approximately 30 weight percent of a modifier oxide selected from the group consisting of iron oxide, cerium oxide, mixtures of cerium oxide and copper oxide, manganese oxide, and mixtures thereof, wherein the catalyst system does not comprise tungsten oxide or vanadium oxide; and at least one second inorganic oxide support comprising at least one zeolite, wherein at least one of the second inorganic oxide supports is an acidic inorganic oxide support, wherein the modifier oxide is supported on the second inorganic oxide support, wherein the weight percent of the silver component is on the basis of silver metal relative to the weight of the first inorganic oxide support, and wherein the weight percent of the modifier oxide is on the basis of the corresponding metal relative to the weight of the second inorganic oxide support, said first catalyst and said second catalyst being disposed in that order from the inlet side to the outlet side of said catalyst system.

16. The method of claim 15, wherein the exhaust gas containing from 1 to 1000 ppm of $NO_x$ and ethanol as said reducing agent, is brought into contact with said catalyst system at a temperature of approximately 300° C. to approximately 500° C.

17. An exhaust gas treatment apparatus comprising: a catalyst system for removing nitrogen oxides from an exhaust gas by reduction with a reducing agent selected from the group consisting of hydrocarbons and oxygen-containing organic compounds, wherein said exhaust gas contains nitrogen oxides and oxygen in an amount larger than a stoichiometric amount relative to unburned components in said exhaust gas, said catalyst system having an inlet side and an outlet side, said catalyst system comprising:

a first catalyst comprising:

approximately 0.2 to approximately 15 weight percent of at least one silver component selected from the group consisting of silver and silver compounds; and at least one first inorganic oxide support, wherein the silver component is supported on the first inorganic oxide support; and a second catalyst comprising:
- approximately 1 to approximately 30 weight percent of a modifier oxide selected from the group consisting of iron oxide, cerium oxide, mixtures of cerium oxide and copper oxide, manganese oxide, and mixtures thereof, wherein the catalyst system does not comprise tungsten oxide or vanadium oxide; and
- at least one second inorganic oxide support comprising at least one zeolite, wherein at least one of the second inorganic oxide supports is an acidic inorganic oxide support, wherein the modifier oxide is supported on the second inorganic oxide support, wherein the weight percent of said the silver component is on the basis of silver metal relative to the weight of the first inorganic oxide support, and wherein the weight percent of the modifier oxide is on the basis of the corresponding metal relative to the weight of the second inorganic oxide support, said first catalyst and said second catalyst being disposed in that order from the inlet side to the outlet side of said catalyst system, and further wherein the catalyst system does not comprise an oxidation catalyst downstream from the second catalyst;
- an exhaust gas source;
- a reservoir of reducing agent; and
- a means for introducing reducing agent from said reservoir into the exhaust gas generated by said exhaust gas source, wherein said exhaust gas contains nitrogen oxides and wherein said reducing agent is introduced into said exhaust gas on the inlet side of said catalyst system.

18. A method for removing nitrogen oxides from an exhaust gas by reduction with an alcohol reducing agent, wherein said exhaust gas contains nitrogen oxides and oxygen in an amount larger than a stoichiometric amount relative to unburned components in said exhaust gas, said method comprising:
- disposing a catalyst system having an inlet side and an outlet side in a flow path of said exhaust gas;
- introducing into said exhaust gas said at least one reducing agent selected from the group consisting of hydrocarbons and oxygen-containing organic compounds on the inlet side of said catalyst system;
- bringing the resulting exhaust gas containing the reducing agent into contact with said catalyst system at a temperature of approximately 150° C. to approximately 650° C., thereby reacting said nitrogen oxides with said reducing agent to remove said nitrogen oxides by reduction;
- said catalyst system comprising a first catalyst comprising a selective catalytic reduction catalyst; and
- a second catalyst comprising:
  - approximately 1 to approximately 30 weight percent of a modifier oxide mixture comprising mixtures of cerium oxide and copper oxide, wherein the wherein the catalyst system does not comprise tungsten oxide or vanadium oxide; and
  - at least one second inorganic oxide support comprising at least one zeolite, wherein at least one of the second inorganic oxide supports is an acidic inorganic oxide support, wherein the modifier oxide is supported on the second inorganic oxide support, wherein the weight percent of the modifier oxide is on the basis of the corresponding metal relative to the weight of the second inorganic oxide support, said first catalyst and said second catalyst being disposed in that order from the inlet side to the outlet side of said catalyst system.

* * * * *